US012187587B2

(12) United States Patent
Pech et al.

(10) Patent No.: US 12,187,587 B2
(45) Date of Patent: Jan. 7, 2025

(54) MOBILE LIFT CRANE WITH VARIABLE POSITION COUNTERWEIGHT

(71) Applicant: GROVE U.S. L.L.C., Shady Grove, PA (US)

(72) Inventors: David J. Pech, Manitowoc, WI (US); Kenneth J. Porubcansky, Whitelaw, WI (US)

(73) Assignee: GROVE U.S. L.L.C., Shady Grove, PA (US)

( * ) Notice: Subject to any disclaimer, the term of this patent is extended or adjusted under 35 U.S.C. 154(b) by 0 days.

(21) Appl. No.: 18/532,256

(22) Filed: Dec. 7, 2023

(65) Prior Publication Data

US 2024/0124276 A1 Apr. 18, 2024

Related U.S. Application Data

(60) Continuation of application No. 17/496,106, filed on Oct. 7, 2021, now Pat. No. 11,884,522, which is a (Continued)

(51) Int. Cl.
*B66C 23/76* (2006.01)

(52) U.S. Cl.
CPC .................................... *B66C 23/76* (2013.01)

(58) Field of Classification Search
CPC ......... B66C 23/76; B66C 23/72; B66C 23/74; E02F 9/18; B62D 49/085
See application file for complete search history.

(56) References Cited

U.S. PATENT DOCUMENTS

| | | | |
|---|---|---|---|
| 496,428 | A | 5/1893 | Morgan |
| 524,619 | A | 8/1894 | Sturm |

(Continued)

FOREIGN PATENT DOCUMENTS

| | | |
|---|---|---|
| AT | 201812 | 6/2001 |
| CN | 86202467 U | 10/1987 |

(Continued)

OTHER PUBLICATIONS

Liftcrane Capacities and Liftcrane Jib Capacities for M-250 with Max-Spander and with X-Spander (English and metric charts), dated Jan. 21, 1994 and Mar. 23, 1994, 78 pages.

(Continued)

*Primary Examiner* — Sang K Kim
*Assistant Examiner* — Nathaniel L Adams
(74) *Attorney, Agent, or Firm* — Cook Alex, Ltd.

(57) ABSTRACT

A mobile lift crane includes a carbody, moveable ground engaging members, a rotating bed, a boom, a mast, and a backhitch. A linear actuation device is pivotally connected to the rotating bed and a moveable counterweight unit is coupled to the linear actuation device. A tension member is coupled to the mast and to one of the linear actuation device and the moveable counterweight unit. The linear actuation device is operable to move the moveable counterweight unit toward and away from the rotating bed during a pick, move, and set operation by extending the linear actuation device. The mobile lift crane is configured such that the moveable counterweight unit is never supported by the ground other than indirectly by the moveable ground engaging members on the carbody throughout all pick, move, and set operations.

20 Claims, 14 Drawing Sheets

Related U.S. Application Data continuation of application No. 16/949,717, filed on Nov. 11, 2020, now abandoned, which is a continuation of application No. 16/417,442, filed on May 20, 2019, now Pat. No. 10,865,079, which is a division of application No. 14/665,886, filed on Mar. 23, 2015, now Pat. No. 10,336,589, which is a continuation of application No. 13/963,993, filed on Aug. 9, 2013, now Pat. No. 8,985,353, which is a continuation of application No. 13/165,287, filed on Jun. 21, 2011, now Pat. No. 8,511,489, which is a continuation of application No. 12/023,902, filed on Jan. 31, 2008, now Pat. No. 7,967,158, which is a continuation-in-part of application No. 11/733,104, filed on Apr. 9, 2007, now Pat. No. 7,546,928.

(60) Provisional application No. 60/863,265, filed on Oct. 27, 2006.

(56) References Cited

U.S. PATENT DOCUMENTS

| | | | |
|---|---|---|---|
| 733,128 | A | 7/1903 | Bennett et al. |
| 752,248 | A | 2/1904 | Nickerson |
| 970,773 | A | 9/1910 | Wylie |
| 1,139,915 | A | 5/1915 | Smulders |
| 1,497,686 | A | 6/1924 | Johnson |
| 1,756,106 | A | 4/1930 | Swenson |
| 1,877,373 | A | 9/1932 | Cohen-Venezian |
| 2,015,604 | A | 9/1935 | Molinelli |
| 2,082,889 | A | 6/1937 | Hight |
| 2,130,487 | A | 9/1938 | Foley |
| 2,368,268 | A | 1/1945 | Spiegel |
| 2,526,613 | A | 10/1950 | Tanguy |
| 3,202,299 | A | 8/1965 | Decuir |
| 3,202,920 | A | 8/1965 | Riebman |
| 3,209,920 | A | 10/1965 | De Cuir |
| 3,378,148 | A | 4/1968 | Stanley |
| 3,435,961 | A | 4/1969 | Hamson |
| 3,501,021 | A | 3/1970 | Schreier et al. |
| 3,547,278 | A | 12/1970 | Tayler et al. |
| 3,572,517 | A | 3/1971 | Liebherr et al. |
| 3,713,544 | A | 1/1973 | Wallace et al. |
| 3,836,010 | A | 9/1974 | Lampson |
| 3,842,984 | A | 10/1974 | Brown et al. |
| 3,874,515 | A | 4/1975 | Leigh |
| 3,912,088 | A | 10/1975 | Bronfman |
| 3,921,815 | A | 11/1975 | Brown et al. |
| 3,924,753 | A | 12/1975 | Lamer et al. |
| 3,930,583 | A | 1/1976 | Jouffray |
| 3,945,518 | A | 3/1976 | Inoue |
| 3,955,684 | A | 5/1976 | Novotny |
| 3,955,844 | A | 5/1976 | De et al. |
| 4,017,109 | A | 4/1977 | Belinsky |
| 4,067,446 | A | 1/1978 | Ray |
| 4,081,081 | A | 3/1978 | Morrow et al. |
| 4,168,781 | A | 9/1979 | Bryan, Jr. |
| 4,172,529 | A | 10/1979 | Bryan, Jr. |
| 4,181,231 | A | 1/1980 | Morrissey et al. |
| 4,186,585 | A | 2/1980 | Calmes et al. |
| 4,196,816 | A | 4/1980 | Dvorsky |
| 4,204,603 | A | 5/1980 | Ducreuzet |
| 4,258,852 | A | 3/1981 | Juergens |
| 4,279,348 | A | 7/1981 | Harper et al. |
| 4,280,627 | A | 7/1981 | Becker |
| 4,349,115 | A | 9/1982 | Lampson |
| 4,353,585 | A | 10/1982 | Carver |
| 4,358,021 | A | 11/1982 | Helm et al. |
| 4,381,060 | A | 4/1983 | Morrow et al. |
| 4,394,911 | A | 7/1983 | Wittman et al. |
| 4,446,976 | A | 5/1984 | Imerman et al. |
| 4,449,635 | A | 5/1984 | Helm et al. |
| 4,508,232 | A | 4/1985 | Lampson |
| 4,537,317 | A | 8/1985 | Jensen |
| 4,540,097 | A | 9/1985 | Wadsworth et al. |
| 4,557,390 | A | 12/1985 | Mick |
| 4,579,234 | A | 4/1986 | Delago et al. |
| 4,614,275 | A | 9/1986 | Zenno |
| 4,711,358 | A | 12/1987 | Konishi |
| 4,729,486 | A | 3/1988 | Petzold et al. |
| 4,867,321 | A | 9/1989 | Montgon |
| 4,901,982 | A | 2/1990 | Havard et al. |
| 4,907,768 | A | 3/1990 | Masseron et al. |
| 4,953,722 | A | 9/1990 | Becker et al. |
| 4,995,518 | A | 2/1991 | McGhie |
| 5,005,714 | A | 4/1991 | Kroell et al. |
| 5,035,337 | A | 7/1991 | Juergens |
| 5,156,215 | A | 10/1992 | Jensen |
| 5,176,267 | A | 1/1993 | Pech |
| 5,199,583 | A | 4/1993 | Weider et al. |
| 5,203,837 | A | 4/1993 | Madic et al. |
| 5,222,613 | A | 6/1993 | McGhie |
| 5,332,110 | A | 7/1994 | Forsyth |
| 5,522,515 | A | 6/1996 | Pech et al. |
| 5,586,667 | A | 12/1996 | Landry |
| 5,598,935 | A | 2/1997 | Harrison et al. |
| 5,833,268 | A | 11/1998 | Aldrovandi |
| 5,836,205 | A | 11/1998 | Meyer |
| 5,854,988 | A | 12/1998 | Davidson et al. |
| 5,941,401 | A | 8/1999 | Petzold et al. |
| 6,039,194 | A | 3/2000 | Beeche et al. |
| 6,065,620 | A | 5/2000 | McGhie |
| 6,089,388 | A | 7/2000 | Willim |
| 6,098,823 | A | 8/2000 | Yahiaoui |
| 6,109,463 | A | 8/2000 | Cullity |
| 6,131,751 | A | 10/2000 | Pech et al. |
| 6,283,315 | B1 | 9/2001 | Willim et al. |
| 6,341,665 | B1 | 1/2002 | Zhou et al. |
| 6,360,905 | B1 | 3/2002 | Frommelt et al. |
| 6,474,485 | B1 | 11/2002 | Yokoyama |
| 6,474,487 | B1 | 11/2002 | Kretschmer |
| 6,481,202 | B1 | 11/2002 | Zuehlke et al. |
| 6,508,372 | B1 | 1/2003 | Lamphen et al. |
| 6,516,961 | B1 | 2/2003 | Knecht et al. |
| 6,568,541 | B2 | 5/2003 | Koreis et al. |
| 6,568,547 | B1 | 5/2003 | Kretschmer et al. |
| 6,588,521 | B1 | 7/2003 | Porubcansky et al. |
| 6,631,814 | B2 | 10/2003 | Willim |
| 6,814,164 | B2 | 11/2004 | Mills et al. |
| 6,934,616 | B2 | 8/2005 | Colburn et al. |
| 7,165,691 | B2 | 1/2007 | Kimura |
| 7,213,716 | B2 | 5/2007 | Willim et al. |
| 7,252,203 | B2 | 8/2007 | Frankenberger et al. |
| 7,441,670 | B2 | 10/2008 | Willim |
| 7,546,928 | B2 | 6/2009 | Pech et al. |
| 7,967,158 | B2 | 6/2011 | Pech et al. |
| 8,033,572 | B2 | 10/2011 | Arzberger et al. |
| 8,162,160 | B2 | 4/2012 | Zollondz et al. |
| 8,528,755 | B2 | 9/2013 | Kurotsu |
| 8,870,001 | B2 | 10/2014 | Sun et al. |
| 8,960,461 | B2 | 2/2015 | Kakeya et al. |
| 9,102,507 | B2 | 8/2015 | Willim |
| 9,278,834 | B2 | 3/2016 | Pech et al. |
| 9,279,834 | B2 | 3/2016 | Eriksson et al. |
| 10,179,722 | B2 | 1/2019 | Pech et al. |
| 10,336,589 | B2 | 7/2019 | Pech et al. |
| 10,647,555 | B2 | 5/2020 | Pech et al. |
| 11,208,303 | B2 | 12/2021 | Pech et al. |
| 11,261,064 | B2 | 3/2022 | Pech et al. |
| 2002/0070186 | A1 | 6/2002 | Frommelt et al. |
| 2003/0146181 | A1 | 8/2003 | Taylor et al. |
| 2005/0061761 | A1 | 3/2005 | Willim et al. |
| 2005/0098520 | A1 | 5/2005 | Frankenberger et al. |
| 2005/0194339 | A1 | 9/2005 | Willim |
| 2006/0043042 | A1 | 3/2006 | Kimura |
| 2006/0283826 | A1 | 12/2006 | Yeral |
| 2008/0099421 | A1 | 5/2008 | Pech et al. |
| 2008/0116161 | A1 | 5/2008 | Kurotsu et al. |
| 2008/0203045 | A1 | 8/2008 | Pech et al. |
| 2008/0264887 | A1 | 10/2008 | Porubcansky |
| 2009/0272708 | A1 | 11/2009 | Zollondz et al. |
| 2010/0072156 | A1 | 3/2010 | Mentink et al. |
| 2010/0213152 | A1 | 8/2010 | Martin et al. |

(56) References Cited

U.S. PATENT DOCUMENTS

| | | | |
|---|---|---|---|
| 2010/0276385 A1 | 11/2010 | Pech et al. | |
| 2011/0031202 A1 | 2/2011 | Pech et al. | |
| 2011/0192815 A1 | 8/2011 | Kurotsu | |
| 2013/0020273 A1 | 1/2013 | Chen et al. | |
| 2013/0161278 A1 | 6/2013 | Sun et al. | |
| 2015/0139915 A1 | 5/2015 | Worgall et al. | |
| 2015/0210514 A1 | 7/2015 | Albinger et al. | |
| 2015/0210515 A1 | 7/2015 | Pech et al. | |
| 2017/0022034 A1 | 1/2017 | Iwazawa | |
| 2017/0022035 A1 | 1/2017 | Iwazawa | |

FOREIGN PATENT DOCUMENTS

| | | | |
|---|---|---|---|
| CN | 2059156 | U | 7/1990 |
| CN | 1044267 | A | 8/1990 |
| CN | 2250345 | | 3/1997 |
| CN | 2355001 | | 12/1999 |
| CN | 1287964 | | 3/2001 |
| CN | 1341524 | | 3/2002 |
| CN | 2642757 | | 9/2004 |
| CN | 1562724 | | 1/2005 |
| CN | 1740080 | | 3/2006 |
| CN | 1765729 | | 5/2006 |
| CN | 201031107 | | 3/2008 |
| CN | 101254888 | | 9/2008 |
| CN | 101311102 | | 11/2008 |
| CN | 101430386 | | 5/2009 |
| CN | 101445209 | | 6/2009 |
| CN | 201284198 | | 8/2009 |
| CN | 201325832 | | 10/2009 |
| CN | 102020210 | | 4/2011 |
| CN | 102167262 | | 8/2011 |
| CN | 102285600 | | 12/2011 |
| CN | 202415028 | | 9/2012 |
| CN | 202529752 | | 11/2012 |
| CN | 202594641 | | 12/2012 |
| CN | 103213909 | | 7/2013 |
| DE | 1007039 | | 4/1957 |
| DE | 1957779 | | 3/1967 |
| DE | 1246969 | | 8/1967 |
| DE | 1264010 | | 3/1968 |
| DE | 1281128 | | 10/1968 |
| DE | 0073132 | | 5/1970 |
| DE | 1781119 | | 10/1970 |
| DE | 3438937 | | 4/1986 |
| DE | 0268458 | | 5/1989 |
| DE | 3838975 | | 5/1990 |
| DE | 9404670 | | 2/1995 |
| DE | 19642066 | | 4/1998 |
| DE | 29723587 | | 11/1998 |
| DE | 19803780 | | 7/1999 |
| DE | 19857779 | | 6/2000 |
| DE | 19908485 | | 8/2000 |
| DE | 19929549 | | 1/2001 |
| DE | 19931301 | | 1/2001 |
| DE | 19931303 | | 2/2001 |
| DE | 20314503 | | 1/2005 |
| DE | 29924989 | | 10/2007 |
| EP | 0048076 | | 3/1982 |
| EP | 0110786 | A1 | 6/1984 |
| EP | 0132572 | A1 | 2/1985 |
| EP | 0354167 | A1 | 2/1990 |
| EP | 0368463 | A1 | 5/1990 |
| EP | 0379448 | A1 | 7/1990 |
| EP | 0856486 | A2 | 8/1998 |
| EP | 0945393 | A2 | 9/1999 |
| EP | 1135322 | A1 | 9/2001 |
| EP | 1205422 | A1 | 5/2002 |
| EP | 1619159 | A2 | 1/2006 |
| EP | 1916220 | A1 | 4/2008 |
| EP | 1934129 | A1 | 6/2008 |
| EP | 1990306 | A2 | 11/2008 |
| EP | 2281771 | A1 | 2/2011 |
| EP | 2354077 | A1 | 8/2011 |
| EP | 2497740 | A1 | 9/2012 |
| EP | 3208226 | A1 | 8/2017 |
| FR | 1408409 | A | 8/1965 |
| FR | 1469592 | A | 2/1967 |
| FR | 1548415 | A | 12/1968 |
| FR | 2172931 | A1 | 10/1973 |
| FR | 2497903 | A1 | 7/1982 |
| FR | 2536733 | A1 | 6/1984 |
| GB | 0113730 | A | 3/1918 |
| GB | 0136752 | A | 12/1919 |
| GB | 0190594 | A | 12/1922 |
| GB | 0604852 | A | 7/1948 |
| GB | 1020635 | A | 2/1966 |
| GB | 1179513 | A | 1/1970 |
| GB | 1207492 | A | 10/1970 |
| GB | 1218826 | A | 1/1971 |
| GB | 1291541 | A | 10/1972 |
| GB | 1311767 | A | 3/1973 |
| GB | 1458170 | A | 12/1976 |
| GB | 2029795 | A | 3/1980 |
| GB | 2050295 | A | 1/1981 |
| GB | 2096097 | A | 10/1982 |
| GB | 2130682 | A | 6/1984 |
| GB | 2151580 | A | 7/1985 |
| GB | 2159122 | A | 11/1985 |
| GB | 2353514 | A | 2/2001 |
| GB | 2353515 | A | 2/2001 |
| GB | 2371284 | A | 7/2002 |
| GB | 2422139 | A | 7/2006 |
| JP | 53-100872 | | 2/1980 |
| JP | 55-145993 | A | 11/1980 |
| JP | 56-145094 | A | 11/1981 |
| JP | 57-096190 | A | 6/1982 |
| JP | 59-043796 | A | 3/1984 |
| JP | 62-041192 | A | 2/1987 |
| JP | 62-203891 | A | 9/1987 |
| JP | 63-026690 | U | 2/1988 |
| JP | 63-032893 | U | 3/1988 |
| JP | 02-070696 | A | 3/1990 |
| JP | 02-182696 | A | 7/1990 |
| JP | 03-158392 | A | 7/1991 |
| JP | 05-201694 | A | 8/1993 |
| JP | 08-188383 | A | 7/1996 |
| JP | 08-301579 | A | 11/1996 |
| JP | 09-328293 | A | 12/1997 |
| JP | 10-022136 | A | 1/1998 |
| JP | 10-087278 | A | 4/1998 |
| JP | 11-029291 | A | 2/1999 |
| JP | 11-049484 | A | 2/1999 |
| JP | 11-157780 | A | 6/1999 |
| JP | 2000-198674 | A | 7/2000 |
| JP | 2002-020081 | A | 1/2002 |
| JP | 2002-070696 | A | 3/2002 |
| JP | 2002-531357 | A | 9/2002 |
| JP | 2003-184086 | A | 7/2003 |
| JP | 2005-138962 | A | 6/2005 |
| JP | 2008-116161 | A | 5/2008 |
| JP | 2008-127150 | A | 6/2008 |
| JP | 2008-143626 | A | 6/2008 |
| JP | 2009-007164 | A | 1/2009 |
| JP | 2011-037634 | A | 2/2011 |
| RU | 2075430 | C1 | 3/1997 |
| RU | 2268234 | C1 | 1/2006 |
| SU | 0088589 | A1 | 11/1950 |
| SU | 0551238 | A1 | 3/1977 |
| SU | 0652096 | A1 | 3/1979 |
| SU | 1087455 | A1 | 4/1984 |
| SU | 1346567 | A1 | 10/1987 |
| SU | 1463705 | A2 | 3/1989 |
| SU | 1477663 | A1 | 5/1989 |
| SU | 1521703 | A1 | 11/1989 |
| WO | 94/29211 | A1 | 12/1994 |
| WO | 00/34173 | A1 | 6/2000 |
| WO | 03/40016 | A1 | 5/2003 |

(56) References Cited

FOREIGN PATENT DOCUMENTS

| | | |
|---|---|---|
| WO | 2005/026036 A1 | 3/2005 |
| WO | 2007/056970 A1 | 5/2007 |

OTHER PUBLICATIONS

Liftcrane Capacities and Liftcrane Jib Capacities for M-250 with X-Spander, dated Jan. 21, 1994 and Mar. 23, 1994, 82 pages.
M-250 Max-Spander Attachment installation and Removal Guide, Manitowoc Engineering Co, vol. 3, Mar. 6, 1994, pp. 1-16 (XP055155658).
Manitowc, Model 16000 Brochure, pp. 1-7, 36-42 showing MAX-ER (Registered), (no date, but 16000 MAX-ER has been on sale since before Aug. 6, 2009).
Manitowc, Model 18000 Brochure, pp. 1-8, 47-51 showing MAX-ER (Registered), (undated, but 18000 MAX-ER has been on sale since before Aug. 6, 2009).
Manitowoc M-50W brochure, 6 pages (1989).
Manitowoc Max-Spander Basic Specifications, 4 paaes (undated).
Manitowoc, M-250 Max-Spander TM Attachment, Installation and Removal Guide folio, 16 pages (Jun. 3, 1994). I.
Manitowoc, M-250 X-Spander /Max-Spander attachment, Operating Controls and Operation folio, 4 pages (Aug. 2, 1994).
Mingqin, et al., Achievement of the Balance Weight Self Adaptation Adjustments of Cranes Through the Application of a Connecting Rod Mechanism, Machine Design and Research, vol. 19 No. 4, 2003, pp. 379-426.
N1—Chapter in "Special Purpose Vehicle" (2000), pp. 32-36.
N2—One page of an answer book showing connection between rods and hydraulic cvlinders.
Non-Final Office Action dated Apr. 20, 2017 in U.S. Appl. No. 14/665,886.
Non-Final Office Action dated Aug. 3, 2017, in Application No. Chinese Application No. 201610557694.8.
Non-Final Office Action dated Feb. 2, 2018, in U.S. Appl. No. 14/606, 891.
Non-Final Office action dated Jan. 29, 2018 in U.S. Appl. No. 14/606,804.
Non-Final Office Action dated Jul. 16, 2018, in U.S. Appl. No. 14/665,886.
Non-Final Office Action dated Jul. 4, 2017, in Japanese Application No. 2016-042643, 0.
Non-Final Office Action dated Oct. 6, 2015, in U.S. Appl. No. 14/665,886.
Notice of Allowance dated Jun. 29, 2018, in U.S. Appl. No. 14/606,804.
Notice of Allowance dated Sep. 12, 2018, in U.S. Appl. No. 14/606,891.
Notice of Reexamination for Chinese Application No. 201010624732.X, dated Mar. 30, 2016 (22 pages).
Notice of Reexamination for Chinese Application No. 201210253579.3, dated Mar. 30, 2016 (22 pages).
Notification of Reason for Rejection for JP Application No. 2008-077842, dated Nov. 24, 2011 (3 pages).
Notification of Reason for Rejection for JP Application No. 2010-175871, dated Jul. 1, 2014 (5 pages).
Notification of Reasons for Rejection, and English language translation thereof, in Japanese Application No. 2010-175871, dated Jul. 7, 2015, 16 pages.
Office Action dated Aug. 18, 2020 from Japanese Patent Office for Japanese Patent Application No. 2019-142243.
Office Action dated Feb. 25, 2020 from Chinese Patent Office for Chinese Patent Application No. 201910487034.0.
Office Action dated Nov. 2, 2012, in Chinese Application No. 2010624732.X.
Office Action dated Oct. 19, 2020 from Chinese Patent Office for Chinese Patent Application No. 201910487034.0.
Office Action for RU Application No. 2007-139810, dated Apr. 12, 2012 (13 pages).
Office Action received for Chinese Patent Application No. 201610562415.7, mailed on Apr. 4, 2022, 28 pages (17 pages of English Translation and 11 pages of Original Document).
Office Action received for EP Application No. 07254071.9, mailed on Feb. 10, 2011, 7 pages.
Office Action received for EP Application No. 08251277.3, mailed on Feb. 17, 2011, 5 pages.
Office Action received for EP Application No. 10172110.8, mailed on Jun. 12, 2013, 4 pages.
Office Action received for EP Application No. 10172110.8, mailed on Nov. 17, 2015, 3 pages.
Office Action received for EP Application No. 13153415.8, mailed on Sep. 22, 2017, 6 pages.
Office Action received for EP Application No. 15739771.2, mailed on Sep. 28, 2020, 10 pages.
Office Action received for EP Application No. 18179050.2, mailed on Apr. 20, 2021, 4 pages.
Office Action received for EP Application No. 18179050.2, mailed on Oct. 20, 2021, 6 pages.
Office Action received for Japanese Patent Application No. 2021032421, mailed on Mar. 8, 2022, 9 pages (4 pages of English Translation and 6 pages of Original Document).
Office Action received for Japanese Patent Application No. 2021067639, mailed on Mar. 1, 2022, 11 pages (5 pages of English Translation and 6 pages of Original Document).
Palfinger extendabie counterweight.
Palfinger, PK 40001 EL Performance Product Guide.
Partial European Search Report for EP Application No. 14183968.8, dated Dec. 16, 2014 (7 pages).
Peng Wensheng, Mechanical Design and Mechanical Principle for Entrance Exams Postgraduate Schools, vol. 2, Huazhong University of Science and Technology Press, May 31, 2005, pp. 83.
Product Guide "MR Range: Potain", Manitowoc Crane Group, 4 pages (2007).
Respondents' Disclosure of Invalidity Contentions, ITC Investigation No. 337-TA-887, dated Sep. 20, 2013, 188 pages.
Search Report from related Chinese Application No. 201210253579.3, dated Nov. 24, 2014 (2 pages).
Second Office Action for Chinese Application No. 201010511568.1, dated May 14, 2012 (14 pages).
Second Office Action from related Chinese Application No. 201210253579.3, dated Dec. 2, 2014 (10 pages).
Sections of brochure entitled "Demag CC 8800, 1250!," Demag Mobile Cranes Gmbh & Co.KG, 9 pages (cover page, pp. 6, 7, 10, 11, 13, 62 and 63, back page), undated, but prior to Oct. 27, 2006.
Sections of brochure entitled "LR 11200 Crawler Crane—Technical Data," Liebherr, 4 pages (cover page, pp. 14, 16a and 16b), undated, but prior to Oct. 27, 2006.
Sections of brochure entitled "Model 21000 Product Guide," Manitowoc, 4 pages, undated, but prior to Oct. 27, 2006.
Terex American HC 125 brochure, 2 pages (2001 ).
Terex American HC 210 brochure, 2002, 2 Pages.
Terex Demag CC8800-1 Crawler Crane Superlift Configurations, Aug. 6, 2009, pp. 7-9.
Terex.rtm., Demag CC8800-1 Crawler Crane, "Superlifl Configurations," 1 page (undated, but prior to Aug. 6, 2009).
Decision to grant a European patent received for EP Application No. 10172110.8, mailed on Apr. 6, 2017, 2 pages.
Decision to grant a European patent received for EP Application No. 13153480.2, mailed on Feb. 16, 2017, 2 pages.
Decision to grant a European patent received for EP Application No. 13153486.9, mailed on Aug. 14, 2014, 2 pages.
Decision to grant a European patent received for EP Application No. 13155808.2, mailed on Nov. 12, 2020, 2 pages.
Decision to grant a European patent received for EP Application No. 14183968.8, mailed on May 12, 2016, 2 pages.
Decision to grant a European patent received for EP Application No. 15739792.8, mailed on Jun. 21, 2019, 2 pages.
Decision to grant a European patent received for EP Application No. 17166174.7, mailed on Jul. 5, 2018, 2 pages.
Decision to grant a European patent received for European Application No. 16173277.1, mailed on May 11, 2018, 2 pages.

(56) References Cited

OTHER PUBLICATIONS

Document entitled "X-Spander Attachment," 1 page (undated, but prior to Aug. 6, 2009).
English language translation of Decision on Rejection, in Chinese Application No. 201010624732.X, dated Jul. 29, 2015, 15 pages.
English translation of Decision of Invalidation (No. 22307), Case No. 4W102283, for Chinese Patent No. 200810092407.6, dated Mar. 14, 2014 (43 pages).
English translation of Decision on Rejection dated Aug. 13, 2015 for Chinese Patent Application No. 201210253579.3.
English translation of Examination Decision on the Request for Invalidation, Case No. 4W102286, for Chinese Patent No. 200710192985.2, dated Mar. 14, 2014 (53 paaes).
English translation of FR 1.548.415 A.
EP13153480.2, European Search Report, dated Mar. 22, 2013, 7 Pages.
European Search Report and Search Opinion received for EP Application No. 07254071.9, mailed on Feb. 22, 2008, 14 pages.
European Search Report and Search Opinion received for EP Application No. 08251277.3, mailed on Nov. 5, 2008, 13 pages.
European Search Report and Search Opinion received for EP Application No. 13153415.8, mailed on Mar. 22, 2013, 9 pages.
European Search Report and Search Opinion received for EP Application No. 13153486.9, mailed on Mar. 22, 2013, 5 pages.
European Search Report and Search Opinion received for EP Application No. 13155808.2, mailed on Mar. 22, 2013, 6 pages.
European Search Report and Search Opinion received for EP Application No. 14183968.8, mailed on Feb. 13, 2015, 10 pages.
European Search Report and Search Opinion received for EP Application No. 15739771.2, mailed on Sep. 12, 2017, 10 pages.
European Search Report and Search Opinion received for EP Application No. 15739792.8, mailed on Sep. 12, 2017, 8 pages.
European Search Report and Search Opinion Received for EP Application No. 16173277.1, mailed on Nov. 22, 2016, 6 pages.
European Search Report and Search Opinion received for EP Application No. 17166174.7, mailed on Jul. 25, 2017, 5 pages.
European Search Report and Search Opinion received for EP Application No. 18179050.2, mailed on Sep. 10, 2018, 6 pages.
European Search Report dated Nov. 25, 2010 in European Application No. 10172110.8.
European Search Report for EP Application No. 10172110.8, dated Nov. 25, 2010 (6 pages).
Examination Report for related European Application No. 13153480.2, dated Jan. 12, 2016 (7 pages).
Examination Report for related European Application No. 13155808.2, dated Jan. 13, 2016 (7 pages).
Final Office Action dated Jan. 17, 2018, in U.S. Appl. No. 14/665,886.
Final Office Action dated May 5, 2016 in U.S. Appl. No. 14/665,886.
First Office Action for Chinese Application No. 201010624732.X, dated Nov. 2, 2012 (13 pages).
First Office Action for Chinese Application No. 201210253579.3, dated Feb. 12, 2014 (16 pages).
Fourth Office Action from related Chinese Application No. 201010624732.X, dated Nov. 3, 2014 (16 pages).
Grove, T80/T86J Telescopic Boom Work Platforms, 2000, 4 Pages.
International Preliminary Report on Patentability received for PCT Patent Application No. PCT/US15/13098, mailed on Aug. 11, 2016, 17 pages.
International Preliminary Reporton Patentability received for PCT Patent Application No. PCT/US15/13039, mailed on Aug. 11, 2016, 10 pages.
International Search Report and Written Opinion received for PCT Patent Application No. PCT/US15/13039, mailed on May 7, 2015, 11 pages.
International Search Report and Written Opinion received for PCT Patent Application No. PCT/US15/13039, mailed or May 7, 2015, 11 pages.
International Search Report and Written Opinion received for PCT Patent Application No. PCT/US15/13098, mailed on May 7, 2015, 19 pages.
Japanese Office Action dated Aug. 4, 2017 for Japanese Application No. 2016-042643.
Japanese Office Action dated Dec. 25, 2018 for corresponding Serial No. 2016-548645.
Japanese Office Action dated May 21, 2019 for corresponding Serial No. 2018-042562.
Japanese Patent Office Notice of Allowance dated Mar. 16, 2021 for Japanese Patent Application No. 2019-142243.
Journal Article: Mingqin, Z., Xiaoli, S., Zhenbo, 0., Chuanzeng, S. & MIngxiao, D. (2003). "Achievement of the Balance Weight Self Adaptation Adjustments of Cranes Through the Application of a Connecting Rod Mechanism," Machine Design and Research, 19 (4) 379-426.
JP2010175871, English language translation of Decision on Rejection Received, dated Jul. 30, 2013, 5 Pages.
Liebherr, LR1600/2 Dimensions, 3 pages (undated, but prior to Aug. 6, 2009).
Liebherr, LR1600/2 Technical Data, 7 pages (undated).
Liebherr, RL44 Litronic Pipelavers, brochure, 8 pages (undated).
American A 100-HC General Specifications, 20 pages (undated, but prior to Aug. 6, 2009).
ANSI/ASME B30.5d, 988, pp. 10 & 16.
Brochure "MR Range: Potain", Manitowoc Crane Group, 4 pages (Mar. 2004) with accompanying photographs (6 pages).
Brochure "Multi Tasker 100/250/810/1000/1200/1600, Railway Crane," Kirow, a member of Kranunion, 16 pages (undated but prior to Aug. 6, 2009).
CAT 587T Pipelayer Specifications, 20 pages (undated).
Chinese Decision of Rejection dated Nov. 2, 2018 in Chinese Patent Application No. 2016105622412.3.
Chinese Decision of Rejection in CN Pat. App. No. 201610562412.3 dated Nov. 2, 2018. English translation included.
Chinese Office Action dated Aug. 9, 2017 for Chinese Application No. 201610562415.7.
Chinese Office Action dated Jul. 3, 2018 for corresponding Serial No. 201610562415.7.
Chinese Office Action dated Jul. 4, 2017 for Chinese Application No. 201610562412.3.
Chinese Office Action dated Jun. 14, 2018 in corresponding Chinese Application No. 201610557694.8.
Chinese Office Action dated Mar. 15, 2018 for Chinese Application No. 201580016861.1.
Chinese Office Action dated May 3, 2018 for Chinese Application No. 201610562412.3.
Chinese Office Action dated Oct. 16, 2017 for Chinese Application No. 201580016861.1.
Communication about intention to grant a European patent received for EP Application No. 07254071.9, mailed on Feb. 19, 2016, 6 pages.
Communication about intention to grant a European patent received for EP Application No. 08251277.3, mailed on May 17, 2013, 6 pages.
Communication about intention to grant a European patent received for EP Application No. 10172110.8, mailed on Aug. 2, 2016, 6 pages.
Communication about intention to grant a European patent received for EP Application No. 10172110.8, mailed on Dec. 7, 2016, 6 pages.
Communication about intention to grant a European patent received for EP Application No. 13153480.2, mailed on Sep. 30, 2016, 7 pages.
Communication about intention to grant a European patent received for EP Application No. 13153486.9, mailed on Mar. 20, 2014, 6 pages.
Communication about intention to grant a European patent received for EP Application No. 13155808.2, mailed on Jun. 24, 2020, 6 pages.
Communication about intention to grant a European patent received for EP Application No. 14183968.8, mailed on Dec. 17, 2015, 6 pages.
Communication about intention to grant a European patent received for EP Application No. 15739771.2, mailed on Apr. 15, 2021, 6 pages.

(56) References Cited

OTHER PUBLICATIONS

Communication about intention to grant a European patent received for EP Application No. 15739792.8, mailed on Feb. 14, 2019, 6 pages.
Communication about intention to grant a European patent received for EP Application No. 17166174.7, mailed on Jan. 23, 2018, 6 pages.
Communication about intention to grant a European patent received for EP Application No. 17166174.7, mailed on Jun. 7, 2018, 6 pages.
Communication for EP Application No. 10172110.8, dated Apr. 29, 2015 (4 pages).
Communication pursuant to Article 94(3) EPC of the Europe Patent Office dated Aug. 24, 2022, for related European Patent Application No. 18179050.2.
Communication under Rule 71(3) EPC received for European Application No. 16173277.1, mailed on Oct. 19, 2017, 6 pages.
Apr. 25, 2018 Office Action in corresponding Chinese Patent Application No. 201610562412.3.
Aug. 1, 2017 Office Action in corresponding Chinese Patent Application No. 201610562415.7.
Drawing Sheet dated Feb. 17, 1998 from Mannesmann Demag Fahrzeugkrane (E9bs).
Drawing Sheet dated Jun. 22, 2009 from Terex Demag GmbH (E9c).
Drawing Sheets date undecipherable) from Mannesmann Demag Fahrzeugkrane (E9b).
Jan. 28, 2019 Office Action in corresponding Chinese Patent Application No. 201610562415.7.
Japanese Office Action dated May 26, 2020 for Japanese Application No. 2018-042562.
Jun. 10, 2019 Office Action in corresponding Chinese Patent Application No. 201610562415.7.
Jun. 14, 2018, 2018 Office Action in corresponding Chinese Patent Application No. 2016105576948.
Jun. 24, 2018 Office Action in corresponding Chinese Patent Application No. 201610562415.7.
Notice of Opposition dated Feb. 1, 2018 in EP 10172110.8.
Pages from Chapter Titled “Assembling the Main Boom”, Section 4.2, pp. 5/89-7/89 (E9a).
Reply to Opposition dated Jun. 28, 2018 for EP 10172110.8.
Summons to Attend Oral Proceedings dated Sep. 27, 2018 in EP 10172110.8.
Third Party Submission dated Mar. 14, 2019 in EP 10172110.8.
Crane Operation Manual, edited by Chen Ganze, Shanghai Scientific & Technological Literature Publishing House, p. 78, published on Apr. 30, 1997.
Data Sheet “Potain MR 605 B H32”, Manitowoc Crane Group, 8 pages (2011 ).
Decision November of 4, Refusal 2015 (2 from pages), related JP Application No. 2010-175871, dated Nov. 4, 2015 (2 pages).
Decision of Reexamination and English Translation for Chinese Application No. 201010511568.1, dated Dec. 11, 2015, overturning final rejection (39 pages).
Decision to grant a European patent received for EP Application No. 07254071.9, mailed on Jun. 30, 2016, 2 pages.
Decision to grant a European patent received for EP Application No. 08251277.3, mailed on Oct. 10, 2013, 2 pages.

FIG. 16
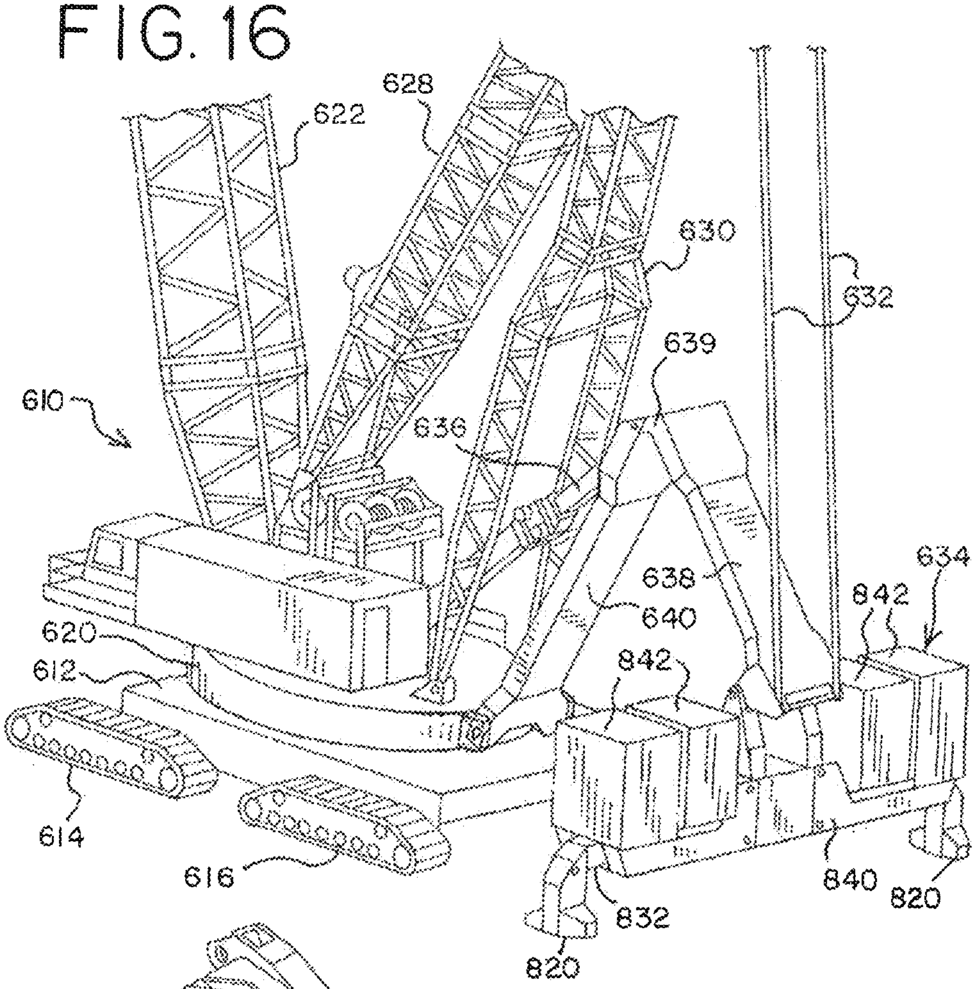
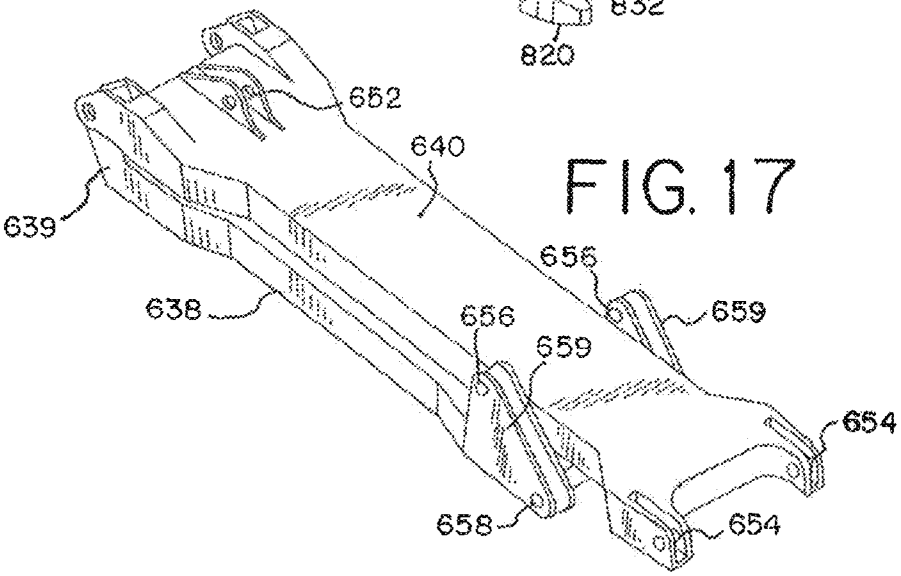
FIG. 17

MOBILE LIFT CRANE WITH VARIABLE POSITION COUNTERWEIGHT

RELATED APPLICATIONS

The present application is a continuation of U.S. patent application Ser. No. 17/496,106 filed Oct. 7, 2021, which is a continuation of U.S. patent application Ser. No. 16/949,717 filed Nov. 11, 2020, now abandoned, which is a continuation of U.S. patent application Ser. No. 16/417,442 filed May 20, 2019, now U.S. Pat. No. 10,865,079, which is a division of U.S. patent application Ser. No. 14/665,886 filed Mar. 23, 2015, now U.S. Pat. No. 10,336,589, which is a continuation of U.S. patent application Ser. No. 13/963,993 filed Aug. 9, 2013, now U.S. Pat. No. 8,985,353, which is a continuation of U.S. patent application Ser. No. 13/165,287, filed Jun. 21, 2011, now U.S. Pat. No. 8,511,489, which is a continuation of U.S. patent application Ser. No. 12/023,902, filed Jan. 31, 2008, now U.S. Pat. No. 7,967,158, which is a continuation-in-part of U.S. patent application Ser. No. 11/733,104, filed Apr. 9, 2007, now U.S. Pat. No. 7,546,928, which in turn claims the benefit under 35 U.S.C. § 119(e) of Provisional U.S. Patent Application Ser. No. 60/863,265, filed Oct. 27, 2006, all of which are hereby incorporated by reference in their entirety.

BACKGROUND

The present application relates to lift cranes, and particularly to mobile lift cranes having a counterweight that can be moved to different positions in an effort to balance a load on the crane.

Lift cranes typically include counterweights to help balance the crane when the crane lifts a load. Sometimes the counterweight on the rear of the crane is so large that the carbody is also equipped with counterweight to prevent backward tipping when no load is being lifted. Further, an extra counterweight attachment, such as a counterweight trailer, is sometimes added to the crane to further enhance the lift capacities of the mobile lift crane. Since the load is often moved in and out with respect to the center of rotation of the crane, and thus generates different moments throughout a crane pick, move and set operation, it is advantageous if the counterweight, including any extra counterweight attachments, can also be moved forward and backward with respect to the center of rotation of the crane. In this way a smaller amount of counterweight can be utilized than would be necessary if the counterweight had to be kept at a fixed distance.

Since the crane needs to be mobile, any extra counterweight attachments also need to be mobile. However, when there is no load on the hook, it is customary to support these extra counterweights on the ground apart from the main crane; otherwise they would generate such a moment that the crane would tip backward. Thus, if the crane needs to move without a load on the hook, the extra counterweight attachment also has to be able to travel over the ground. This means that the ground has to be prepared and cleared, and often timbers put in place, for swing or travel of the extra counterweight unit.

A typical example of the forgoing is a TEREX® DEMAG® CC8800 crane with a Superlift attachment. This crane includes 100 metric tonne of carbody counterweight, 280 metric tonne of crane counterweight, and 640 metric tonne on an extra counterweight attachment, for a total of 1020 metric tonne of counterweight. The extra counterweight can be moved in and out by a telescoping member. This crane has a maximum rated load moment of 23,500 metric tonne-meters. Thus the ratio of maximum rated load moment to total weight of the counterweight is only 23.04.

While all of this counterweight makes it possible to lift heavy loads, the counterweight has to be transported whenever the crane is dismantled for moving to a new job site. With U.S. highway constraints, it takes 15 trucks to transport 300 metric tonne of counterweight. Thus there is a need for further improvements in mobile lift cranes, where the same large loads can be lifted using less total crane counterweight.

BRIEF SUMMARY

A mobile lift crane and method of operation has been invented which use a reduced amount of total counterweight, but wherein the crane is still mobile and can lift loads comparable to a crane using significantly more total counterweight. In a first aspect, the invention is a mobile lift crane comprising a carbody having moveable ground engaging members; a rotating bed rotatably connected to the carbody such that the rotating bed can swing with respect to the ground engaging members; a boom pivotally mounted on a front portion of the rotating bed; a mast mounted at its first end on the rotating bed; a backhitch connected between the mast and a rear portion of the rotating bed; a moveable counterweight unit; at least one linear actuation device; and at least one arm pivotally connected at a first end to the rotating bed and at a second end to the linear actuation device. The arm and linear actuation device are connected between the rotating bed and the counterweight unit such that extension and retraction of the linear actuation device changes the position of the counterweight unit compared to the rotating bed.

In a second aspect, the invention is a mobile lift crane comprising a carbody having moveable ground engaging members; a rotating bed rotatably connected to the carbody such that the rotating bed can swing with respect to the ground engaging members; a boom pivotally mounted on a front portion of the rotating bed; a mast mounted at its first end on the rotating bed at a fixed angle compared to the plane of rotation of the rotating bed; a moveable counterweight unit suspended from a tension member connected at second end of the mast; and a counterweight movement structure connected between the rotating bed and the counterweight unit such that the counterweight unit may be moved to and held at a position in front of the top of the mast and moved to and held at a position rearward of the top of the mast.

A third aspect of the invention is a mobile lift crane comprising a carbody having moveable ground engaging members; a rotating bed rotatably connected about an axis of rotation to the carbody such that the rotating bed can swing with respect to the ground engaging members; a boom pivotally mounted on a front portion of the rotating bed; a mast mounted at its first end on the rotating bed; a moveable counterweight unit; and a counterweight movement structure connected between the rotating bed and the counterweight unit such that the counterweight unit may be moved to and held at both a forward position and a rearward position; wherein the crane has a total amount of counterweight of at least 250 metric tonne and a maximum rated load moment of at least 6,250 metric tonne-meters, and the ratio of the maximum rated load moment to the total weight of all of the counterweight on the crane is at least 25 tonne-meters/tonne.

A fourth aspect of the invention is a method of operating a mobile lift crane. The lift crane comprises a carbody having moveable ground engaging members; a rotating bed rotatably connected to the carbody such that the rotating bed can swing with respect to the ground engaging members; a boom pivotally mounted on a front portion of the rotating bed, with a hoist line extending therefrom; a mast mounted at its first end on the rotating bed; and a moveable counterweight unit. The method comprises the steps of positioning the counterweight forward of a point directly below the top of the mast when no load is on the hook; and positioning the counterweight reward of the top of the mast when the hoist line is supporting a load; wherein the moveable counterweight is never supported by the ground during crane pick, move and set operations other than indirectly by the ground engaging members on the carbody.

In a fifth aspect, the invention is a method of operating a mobile lift crane. The lift crane comprises a carbody having moveable ground engaging members; a rotating bed rotatably connected to the carbody such that the rotating bed can swing with respect to the ground engaging members; a boom pivotally mounted on a front portion of the rotating bed, with a hoist line extending therefrom; a mast mounted at its first end on the rotating bed; at least one linear actuation device; and a moveable counterweight unit. The method comprises the step of performing a pick, move and set operation with a load wherein the moveable counterweight is moved toward and away from the front portion of the rotating bed by retracting and extending the linear actuation device during the pick, move and set operation to help counterbalance the load, but wherein the counterweight is never supported by the ground other than indirectly by the ground engaging members on the carbody.

In a sixth aspect, the invention is a mobile lift crane comprising a carbody having moveable ground engaging members; a rotating bed rotatably connected about an axis of rotation to the carbody such that the rotating bed can swing with respect to the ground engaging members; a boom pivotally mounted on a front portion of the rotating bed; a moveable counterweight unit; and a counterweight movement structure connected between the rotating bed and the counterweight unit such that the counterweight unit may be moved to and held at both a forward position and a rearward position; wherein the counterweight movement structure comprises a rack and pinion assembly having housing and a rack, the rack having a rectangular cross section with first and second sides opposite one another and third and fourth sides opposite one another, and having teeth on the first side and second sides, and at least first and third pinion gears engaged with the teeth on the first side of the rack and second and fourth pinion gears engaged with the teeth on the second side of the rack, and wherein each pinion gear is driven by a separate hydraulic motor, and wherein the motor driving the first pinion gear is mounted on the housing adjacent an opposite side of the rack from the motor driving the third pinion gear, and wherein the motor driving the second pinion gear is mounted on the housing adjacent an opposite side of the rack from the motor driving the fourth pinion gear.

In a seventh aspect, the invention is a mobile lift crane comprising a carbody having moveable ground engaging members; a rotating bed rotatably connected to the carbody such that the rotating bed can swing with respect to the ground engaging members; a boom pivotally mounted on a front portion of the rotating bed and including a load hoist line for handling a load; a moveable counterweight unit; a counterweight movement structure connected between the rotating bed and the counterweight unit such that the counterweight unit may be moved to and held at both a forward position and a rearward position; and a counterweight support structure attached to the counterweight unit including at least two ground engaging members that can provide support to the counterweight in the event of a sudden release of the load, the support structure comprising a telescoping structure connected to and between the ground engaging members such that the distance between the ground engaging members can be adjusted between at least a first and second position.

With one embodiment of the lift crane of the present invention, a single large counterweight can be positioned far forward such that it produces very little backward moment on the crane when no load is on the hook. As a result, the carbody need not have extra counterweight attached to it. This large counterweight can be positioned far backward so that it can counterbalance a heavy load. Thus a 700 metric tonne counterweight can be used as the only counterweight on the crane, and the crane can still lift loads equivalent to those of the TEREX® DEMAG® CC8800 Superlift with 1020 metric tonne of counterweight. Another advantage of the preferred embodiment of the invention is that the counterweight need not be set on the ground when the crane sets its load. There is no extra counterweight unit requiring a trailer, and the limitations of having to prepare the ground for such a trailer.

These and other advantages of the invention, as well as the invention itself, will be more easily understood in view of the attached drawings.

BRIEF DESCRIPTION OF THE DRAWINGS

FIG. 16 is rear perspective view of the crane of FIG. 15.

FIG. 17 is perspective view of the pivot frame and arm of the crane of FIG. 15 shown in a folded mode, ready for transport.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows.

The front of the rotating bed is defined as the portion of the rotating bed that is between the axis of rotation of the rotating bed and the position of the load when a load is being lifted. The rear portion of the rotating bed includes everything opposite the axis of rotation from the front of the rotating bed. The terms “front” and “rear” (or modifications thereof such as “rearward”) referring to other parts of the rotating bed, or things connected thereto, such as the mast, are taken from this same context, regardless of the actual position of the rotating bed with respect to the ground engaging members.

The position of the counterweight unit is defined as the center of gravity of the combination of all counterweight elements and any holding tray to which the counterweights are attached, or otherwise move in conjunction with. All counterweight units on a crane that are tied together so as to always move simultaneously are treated as a single counterweight for purposes of determining the center of gravity.

The top of the mast is defined as the furthest back position on the mast from which any line or tension member supported from the mast is suspended. If no line or tension member is supported from the mast, then the top of the mast is the position to which any backhitch is attached.

The moveable ground engaging members are defined as members that are designed to remain engaged with the ground while the crane moves over the ground, such as tires or crawlers, but does not include ground engaging members that are designed to be stationary with respect to the ground, or be lifted from contact with the ground when they are moved, such as a ring on a ring supported crane.

The term “move” when referring to a crane operation includes movement of the crane with respect to the ground. This can be either a travel operation, where the crane traverses a distance over the ground on its ground engaging members, a swing operation, in which the rotating bed rotates with respect to the ground, or combinations of travel and swing operations.

Figure 5:
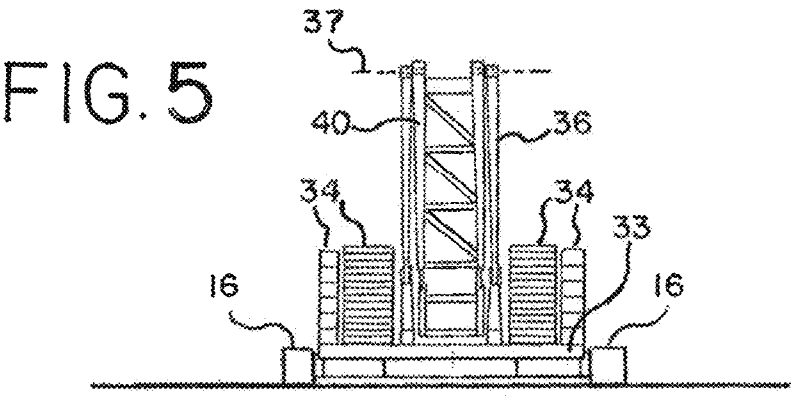
FIG. 5 is a partial rear elevational view of the crane of FIG. 1.
Figure 3:
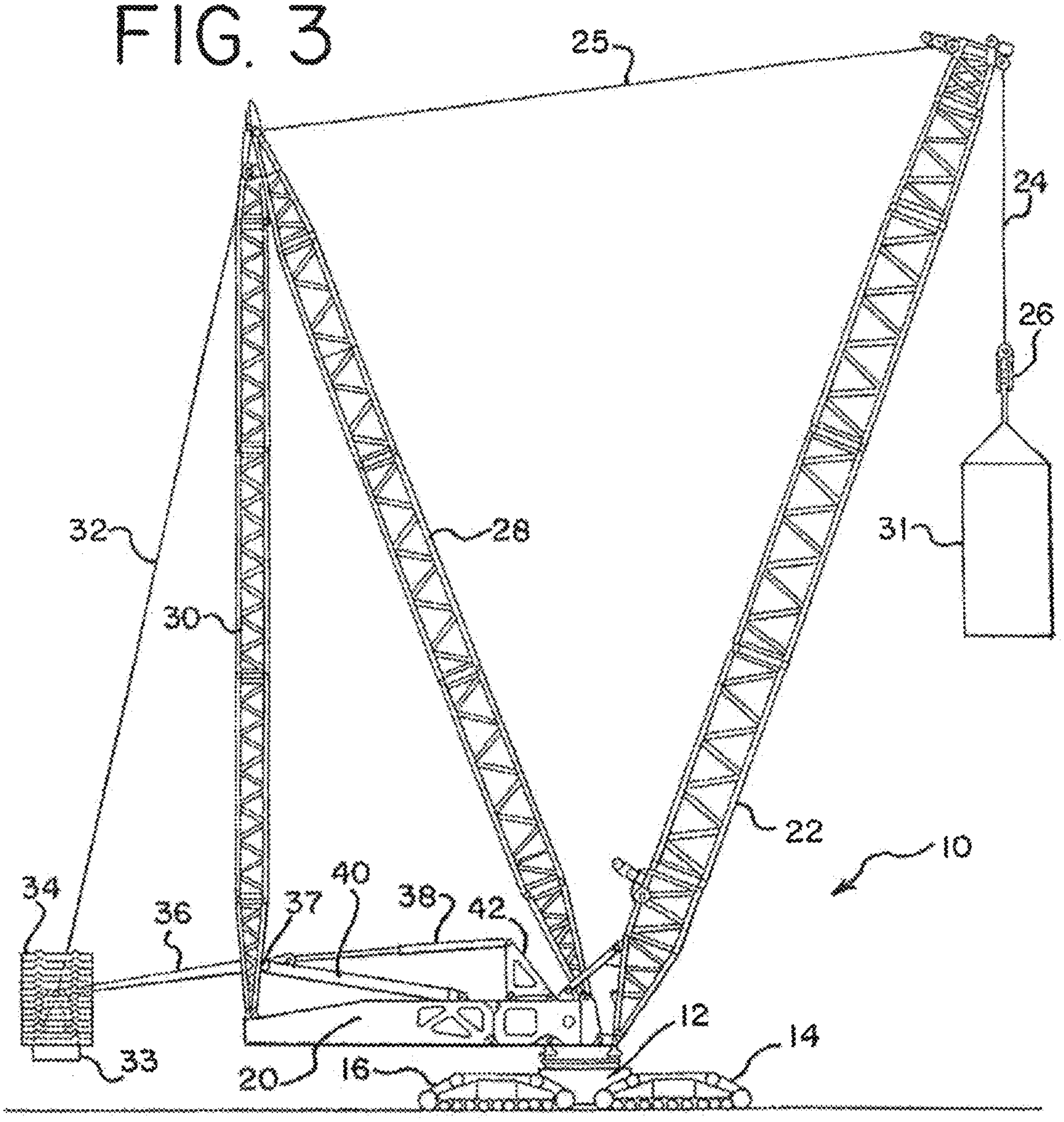
FIG. 3 is a side elevational view of the mobile lift crane of FIG. 1 with the counterweight in a rear position.
Figure 4:
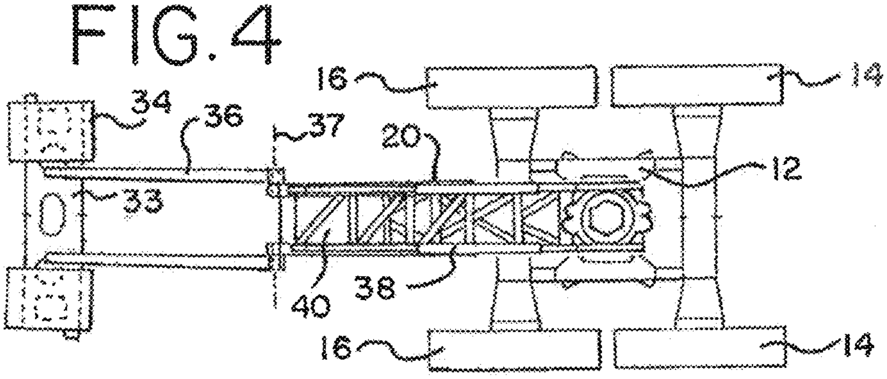
FIG. 4 is a partial top plan view of the crane of FIG. 1 with the counterweight in a rear position.

Seven embodiments of the invention are shown in the attached drawings. In the first embodiment, shown in FIGS. 1-5, the mobile lift crane 10 includes lower works, also referred to as a carbody 12, and moveable ground engaging members in the form of crawlers 14 and 16. (There are of course two front crawlers 14 and two rear crawlers 16, only one each of which can be seen from the side view of FIG. 1. The other set of crawlers can be seen in the top view of FIG. 4.) (FIGS. 4 and 5 are simplified for sake of clarity, and do not show the boom, mast, and backhitch.) In the crane 10, the ground engaging members could be just one set of crawlers, one crawler on each side. Of course additional crawlers than those shown, or other ground engaging members such as tires, can be used.

A rotating bed 20 is rotatably connected to the carbody 12 such that the rotating bed can swing with respect to the ground engaging members. The rotating bed is mounted to the carbody 12 with a slewing ring, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed; a backhitch 30 connected between the mast and a rear portion of the rotating bed; and a moveable counterweight unit having counterweights 34 on a support member 33. The counterweights may be in the form of multiple stacks of individual counterweight members on the support member 33 as shown in FIG. 5.

Figure 1:
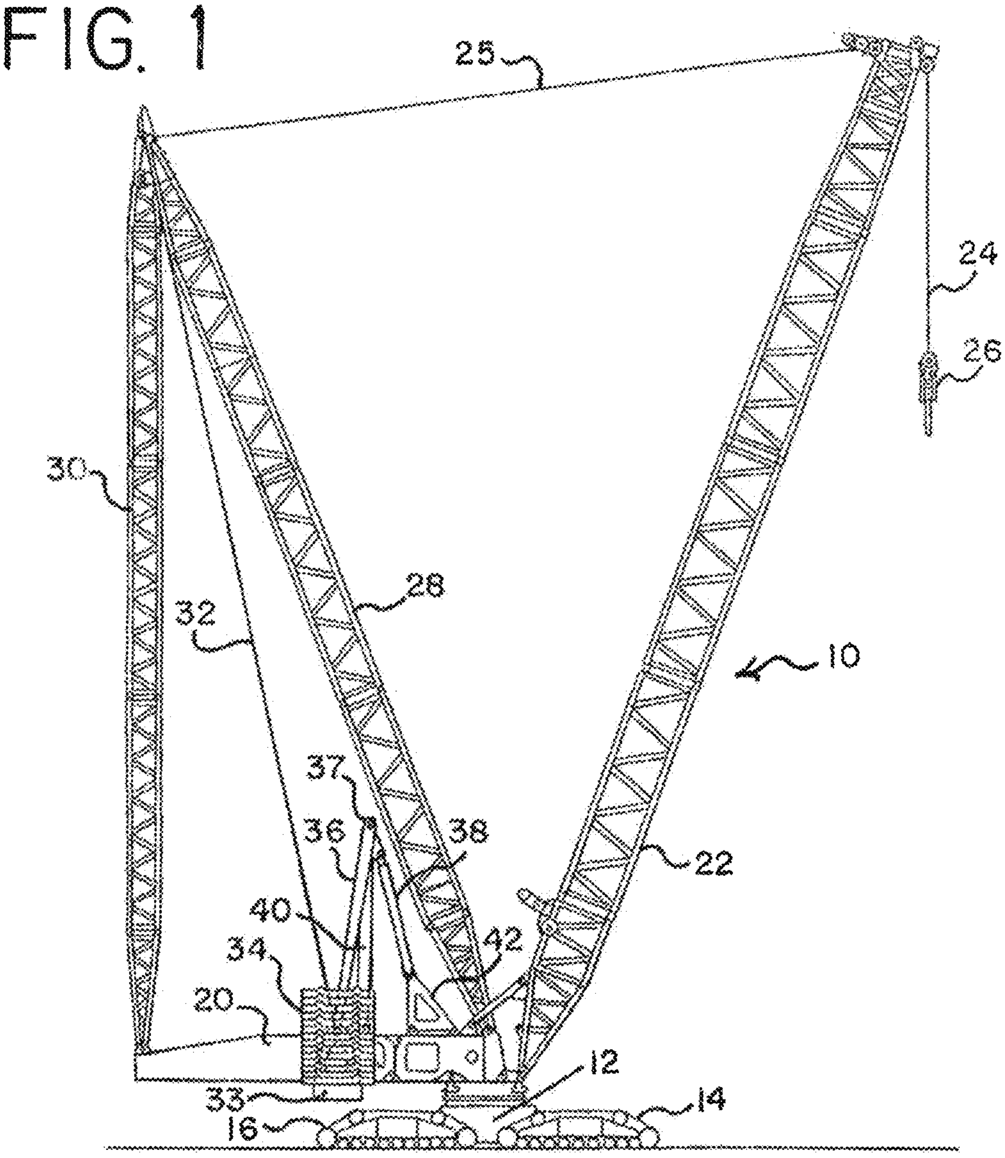
FIG. 1 is a side elevational view of a first embodiment of a mobile lift crane with a variable position counterweight, shown with the counterweight in a far forward position.

Boom hoist rigging 25 between the top of mast 28 and boom 22 is used to control the boom angle and transfers load so that the counterweight can be used to balance a load lifted by the crane. A hoist line 24 extends from the boom 22, supporting a hook 26. The rotating bed 20 may also includes other elements commonly found on a mobile lift crane, such as an operator’s cab and hoist drums for the rigging 25 and hoist line 24. If desired, the boom 22 may comprise a luffing jib pivotally mounted to the top of the main boom, or other boom configurations. The backhitch 30 is connected adjacent the top of the mast 28. The backhitch 30 may comprise a lattice member designed to carry both compression and tension loads as shown in FIG. 1. In the crane 10, the mast is held at a fixed angle with respect to the rotating bed during crane operations, such as a pick, move and set operation.

The counterweight unit is moveable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast. At least one linear actuation device, in this embodiment a hydraulic cylinder 38, and at least one arm pivotally connected at a first end to the rotating bed and at a second end to the hydraulic cylinder are used in the counterweight movement structure of crane 10 to change the position of the counterweight. The arm and hydraulic cylinder 38 are connected between the rotating bed and the counterweight unit such that extension and retraction of the hydraulic cylinder changes the position of the counterweight unit compared to the rotating bed.

In the crane 10, the at least one arm preferably comprises a pivot frame 40 and a rear arm 36. (As with the crawlers, the rear arm 36 actually has both left and right members (FIGS. 4 and 5), only one of which can be seen in FIG. 1, and the hydraulic cylinder comprises two cylinders that move in tandem. However, the following discussion only refers to one cylinder 38 and one arm 36 for sake of simplicity.) The pivot frame 40 is connected between the rotating bed 20 and hydraulic cylinder 38, and the rear arm 36 is connected between the pivot frame 40 and the counterweight unit. A trunnion 37 is used to connect the rear arm 36 and pivot frame 40. The hydraulic cylinder 38 is pivotally connected to the rotating bed 20 on a support frame 42 which elevates the hydraulic cylinder 38 to a point so that the geometry of the cylinder 38, pivot frame 40 and rear arm 36 can move the counterweight through its entire range of motion. In this manner the cylinder 38 causes the rear arm 36 to move the counterweight unit when the cylinder is retracted and extended.

Figure 2:
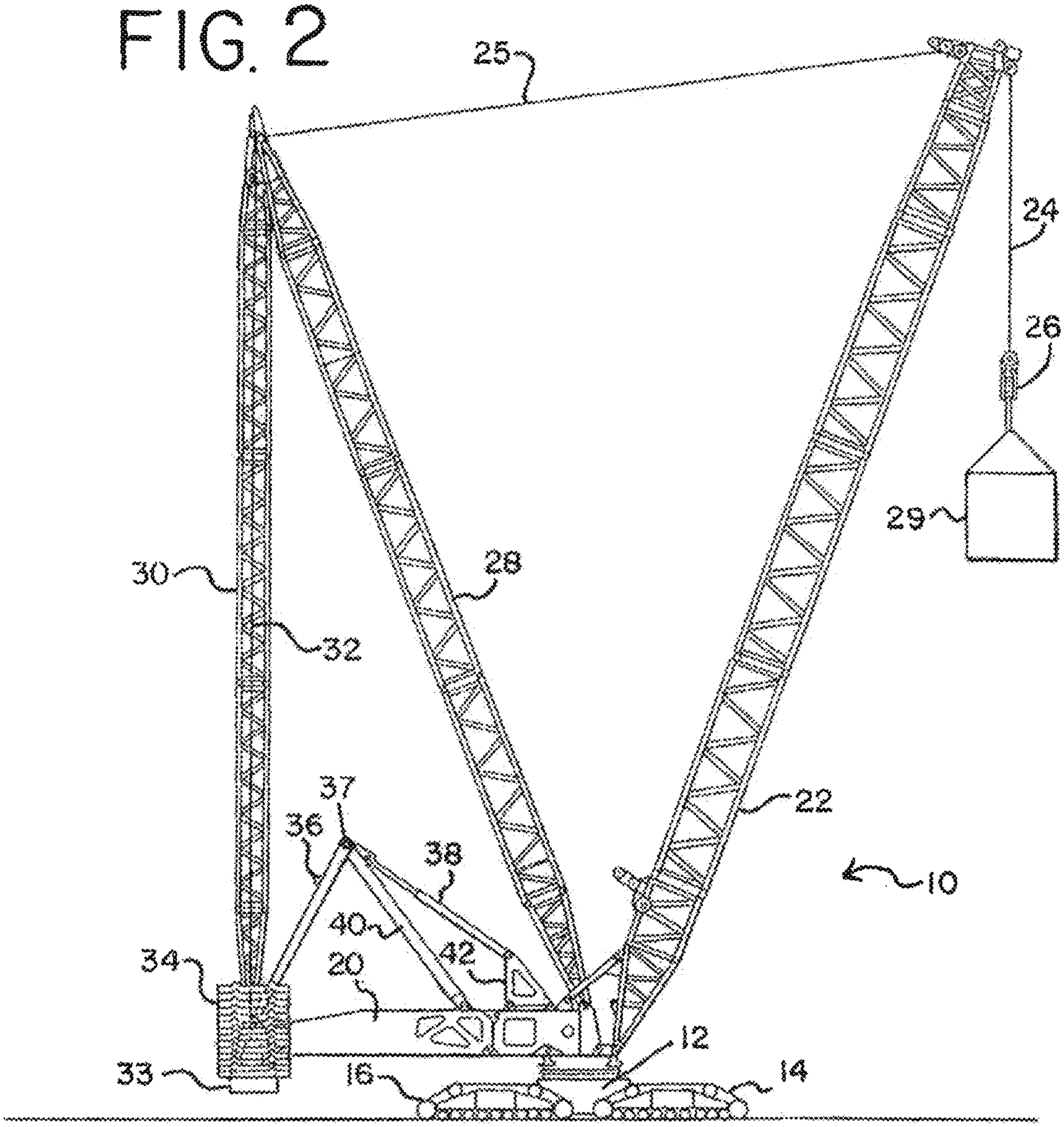
FIG. 2 is a side elevational view of the mobile lift crane of FIG. 1 with the counterweight in a mid position.

While FIG. 1 shows the counterweight unit in its most forward position, FIG. 2 shows the hydraulic cylinder 38 partially extended, which moves the counterweight unit to a mid position, such as when a first load 29 is suspended from the hook 26. FIGS. 3 and 4 show the cylinder 38 fully extended, which moves the counterweight unit to its most rearward position, such as when a larger load 31 is suspended from the hook, or the boom is pivoted forward to extend the load further from the rotating bed. Thus, in the method of operation of crane 10, the counterweight is positioned forward of a point directly below the top of the mast when no load is on the hoist line; and the counterweight is positioned reward of the top of the mast when the hoist line supports a load. (The phrase "no load" on the hoist line is used in its common meaning of no extra lifted load. Of course the hook and any associated hook block may have a significant weight and apply tension to the hoist line even when no load is on the hoist line.)

As noted earlier, with the preferred embodiment of the present invention, the moveable counterweight is never supported by the ground during crane operations. The crane can performing a pick, move and set operation with a load wherein the moveable counterweight is moved toward and away from the front portion of the rotating bed by retracting and extending the hydraulic cylinder during the operation to help counterbalance the load, but the counterweight is never supported by the ground other than indirectly by the ground engaging members on the carbody. Further, the single moveable counterweight unit is the only functional counterweight on the crane. The carbody is not provided with any separate functional counterweight. The fact that the counterweight unit can be moved very near to the centerline of rotation of the crane means that the counterweight does not produce a large backward tipping moment in that configuration, which would otherwise require the carbody to carry additional counterweight. (The phrase "not provided with any separate functional counterweight" is meant to differentiate prior art cranes where the carbody is specifically designed to include significant amounts of counterweight used to prevent backward tipping of the crane.) For example, as seen in many of the embodiments, and at least in FIGS. 1, 8, 9, 10 and 15, the counterweight unit can be brought in so close to the centerline of rotation that the center of gravity of the counterweight unit is in front of the rear end of the crawlers.

Figure 6:
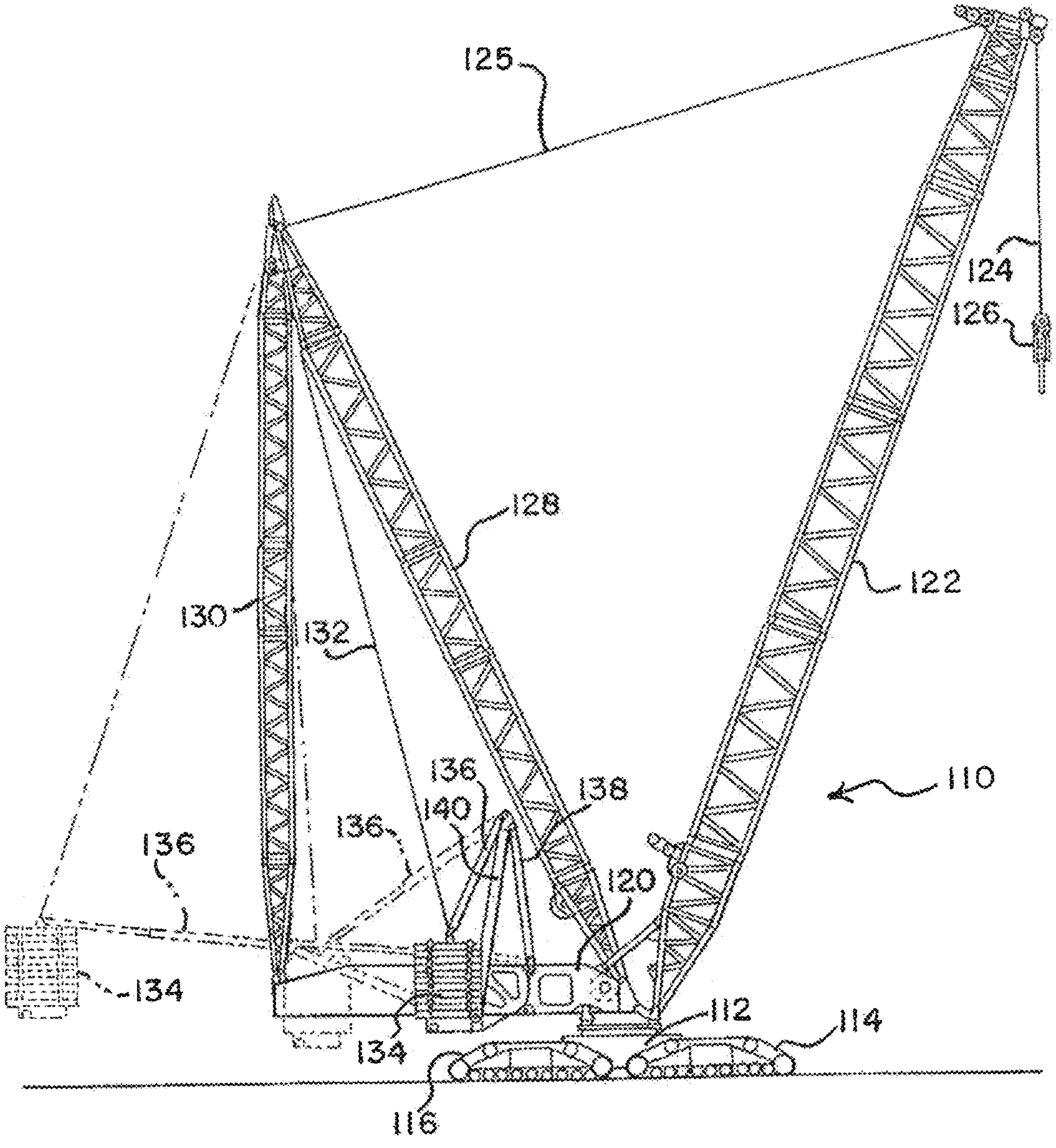
FIG. 6 is a side elevational view of a second embodiment of a mobile lift crane of the present invention, with dashed lines showing the counterweight in various positions.

FIG. 6 shows a second embodiment of a crane 110 of the present invention. Like the crane 10, crane 110 includes a carbody 112, crawlers 114 and 116, a rotating bed 120, boom 122, boom hoist rigging 125, a load hoist line 124, a hook 126, a mast 128, a backhitch 130, a tension member 132 and a counterweight unit 134. The primary difference between the crane 110 compared to crane 10 is the configuration of the cylinder and arm used to move the counterweight unit. In crane 110 there are two hydraulic cylinders 136 and 138 Like cylinder 38, cylinder 138 is pivotally connected to the rotating bed 120. Also, arm 140 is pivotally connected at one end to the rotating bed and at its other end to the cylinder 138. However, in this embodiment the second hydraulic cylinder 136 is connected between the arm and the counterweight unit, as the rear arm 36 was in crane 10. The counterweight unit can be moved between a far forward position, when both hydraulic cylinders are retracted, to mid and far rearward positions (shown in phantom lines) when, respectively, the rear cylinder 136 is extended, and when both cylinders are fully extended.

Figure 7:
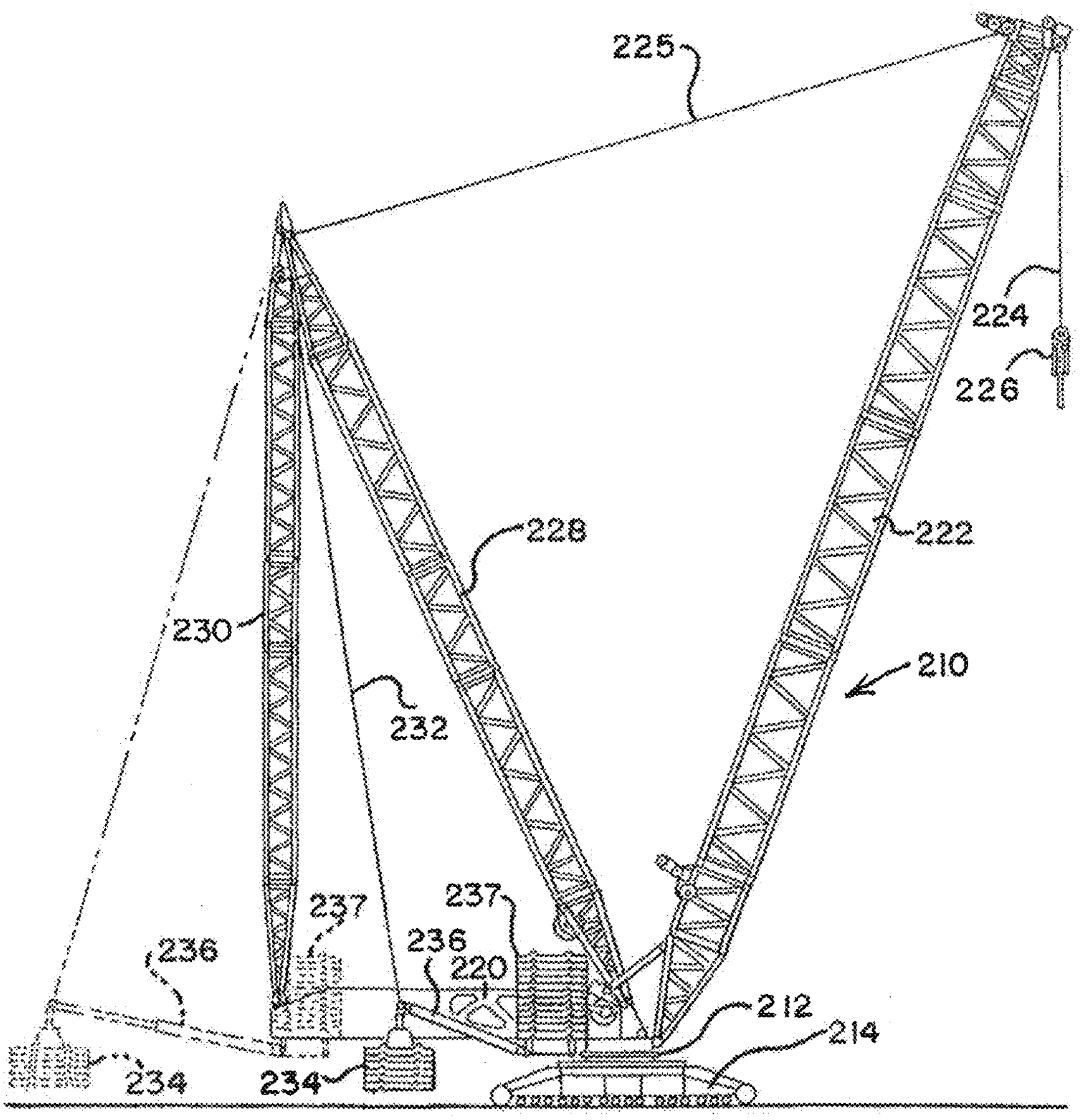
FIG. 7 is a side elevational view of a third embodiment of a mobile lift crane of the present invention, with dashed lines showing the counterweight in various positions.

FIG. 7 shows a third embodiment of a crane 210. Like the cranes 10 and 110, crane 210 includes a carbody 212, crawlers 214, a rotating bed 220, boom 222, boom hoist rigging 225, a load hoist line 224, a hook 226, a mast 228, a backhitch 230, a tension member 232 and a counterweight unit 234. This crane is different than cranes 10 and 110 in that it has a second counterweight unit 237 which is supported directly on the rotating bed. Also, instead of having an arm and a hydraulic cylinder to move the counterweight unit 234, it has only one hydraulic cylinder 236. Further, the cylinder 236 is only indirectly connected to the rotating bed, as it is connected to the second counterweight unit which is supported on the rotating bed. In this fashion, when the second counterweight unit 237 is moved forward and backward, the counterweight unit 234 is also moved. The hydraulic cylinder 236 can be extended to move the counterweight 234 even further away from the centerline of rotation of the rotating bed, as shown in phantom lines.

Figure 8:
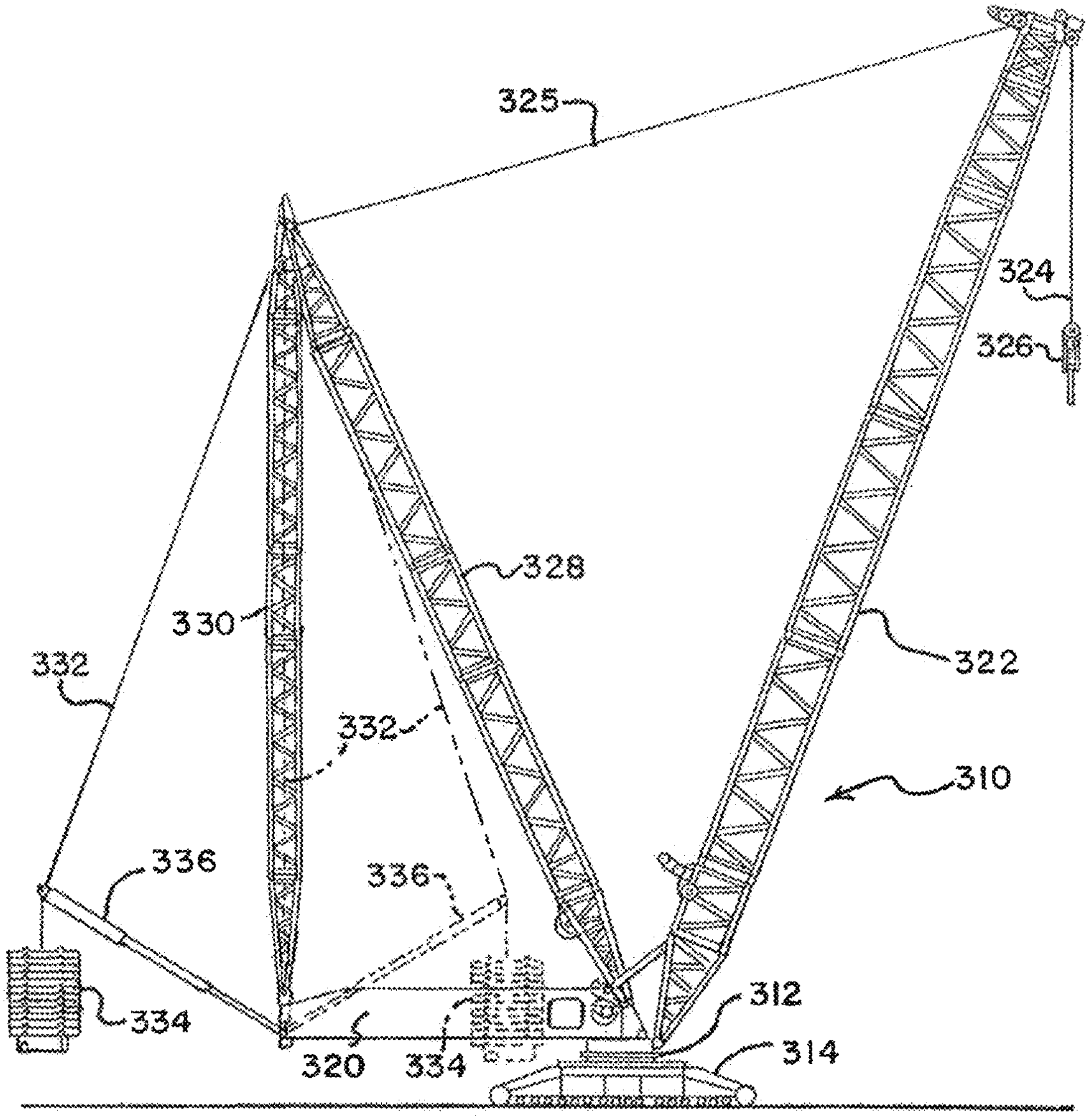
FIG. 8 is a side elevational view of a fourth embodiment of a mobile lift crane of the present invention, with dashed lines showing the counterweight in a second position.

FIG. 8 shows a fourth embodiment of a crane 310 of the present invention. Like the crane 10, crane 310 includes a carbody 312, crawlers 314, rotating bed 320, boom 322, boom hoist rigging 325, a load hoist line 324, a hook 326, a mast 328, a backhitch 330, a tension member 332 and a counterweight 334. The primary difference between the crane 310 compared to crane 10 is that only the hydraulic cylinder 336 is used to move the counterweight unit, and no pivoting arm is employed Like cylinder 38, cylinder 336 is pivotally connected to the rotating bed 320. However, in this embodiment the hydraulic cylinder 336 is connected to the counterweight unit, in this case indirectly by being connected to tension member 332. The counterweight unit can be moved between a far forward position (shown in phantom lines) when the hydraulic cylinder 336 is fully extended in one direction. The counterweight is moved to a mid position by retracting the cylinder 336. The counterweight is moved into a far rearward position when the cylinder 336 is again fully extended.

Figure 9:
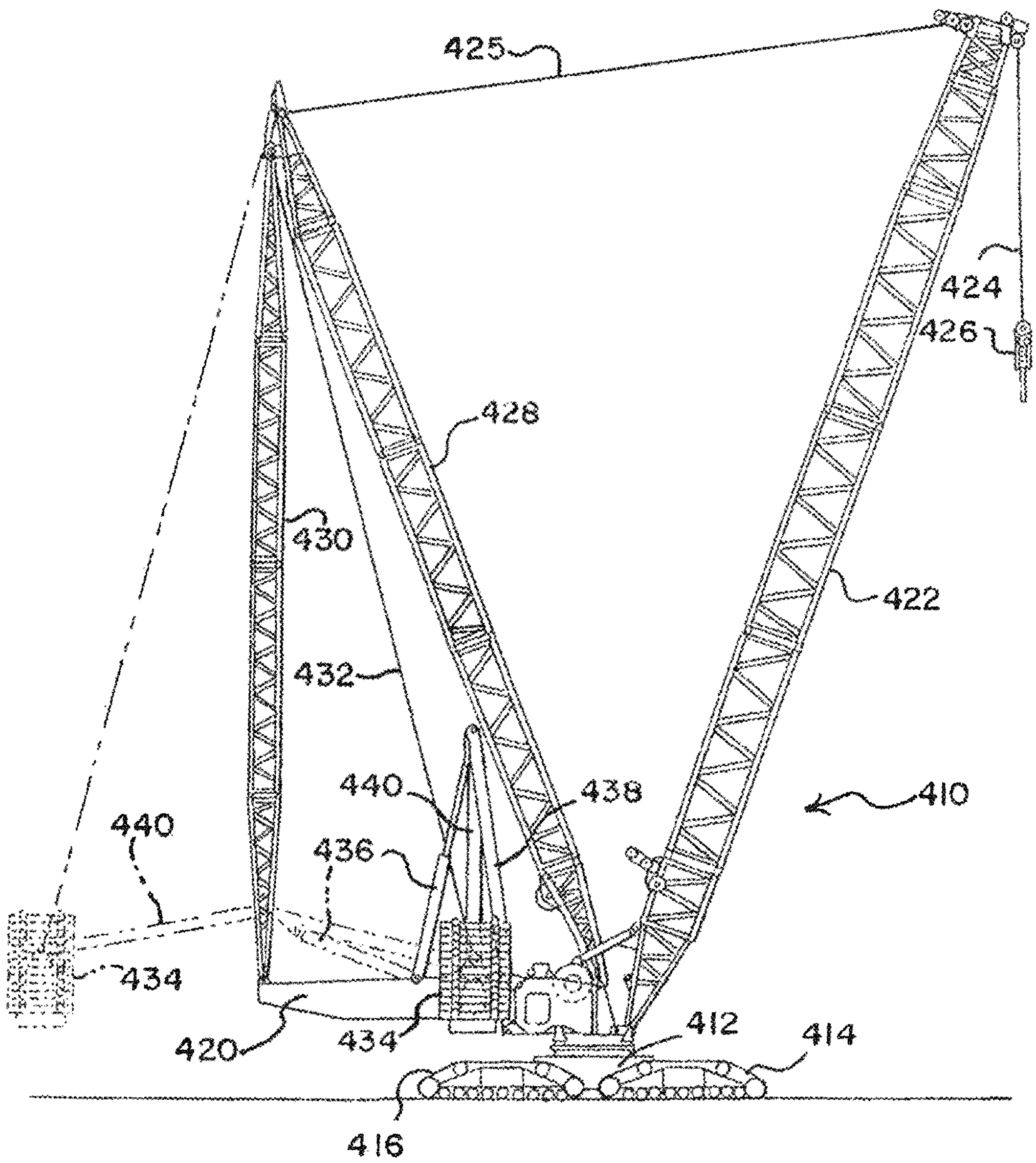
FIG. 9 is a side elevational view of a fifth embodiment of a mobile lift crane of the present invention, with dashed lines showing the counterweight in a second position.
Figure 10:
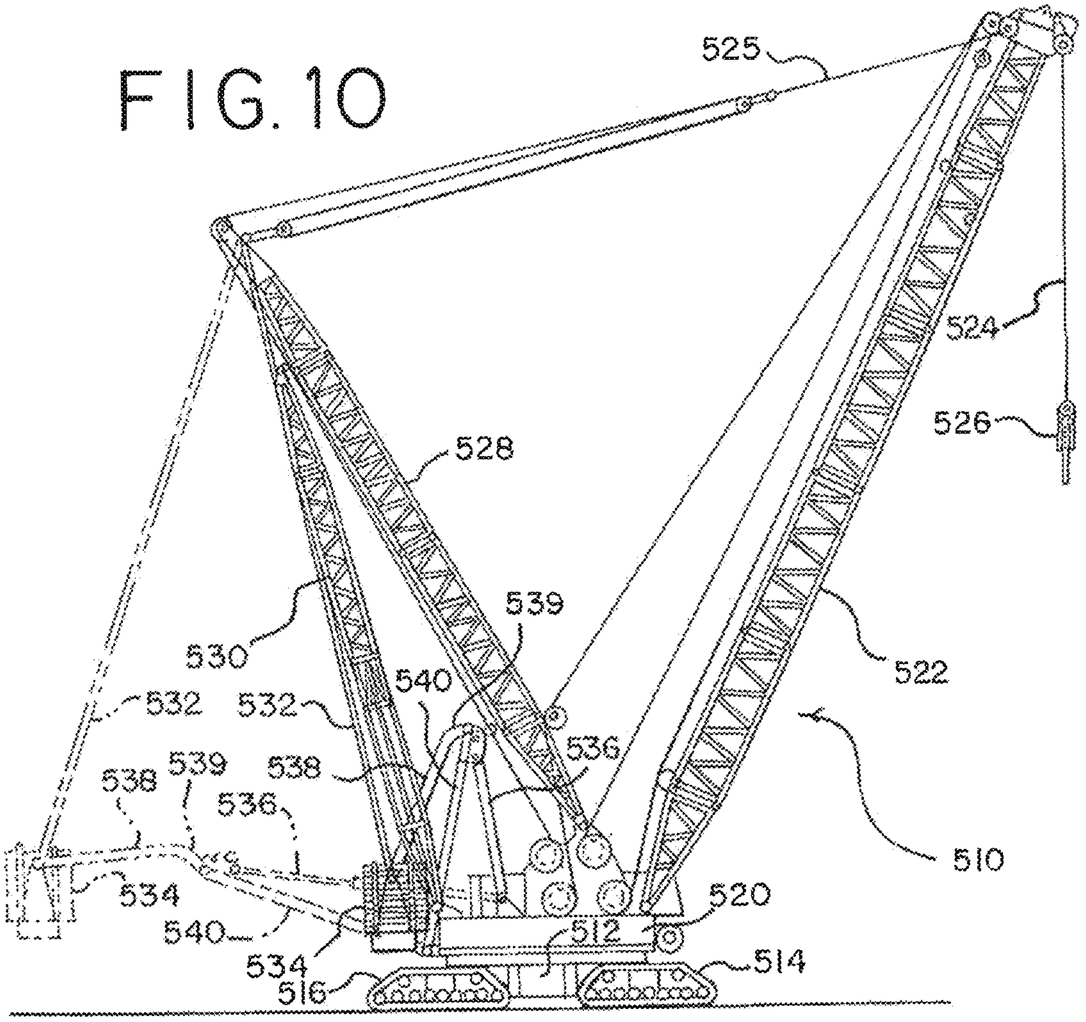
FIG. 10 is a side elevational view of a sixth embodiment of a mobile lift crane of the present invention, with dashed lines showing the counterweight in a second position.

FIG. 9 shows a fifth embodiment of a crane 410 of the present invention. Like crane 10, crane 410 includes a carbody 412, crawlers 414 and 416, a rotating bed 420, boom 422, boom hoist rigging 425, a load hoist line 424, a hook 426, a mast 428, a backhitch 430, a tension member 432 and a counterweight unit 434. The primary difference between the crane 410 compared to crane 10 is the configuration of the cylinder and arms used to move the counterweight unit, and the fact that the counterweight is moved backward by retracting the cylinder. In crane 410 the hydraulic cylinder 436 is pivotally connected to the rotating bed, but at a point behind where the arm 438 connects to the rotating bed. Arm 438 is pivotally connected at one end to the rotating bed and at its other end to the cylinder 436. A second arm 440 is connected between the arm 438 and the counterweight unit 434, as the rear arm 36 was in crane 10. The counterweight unit can be moved between a far forward position, when the hydraulic cylinder 436 is fully extended, to a far rearward position (shown in phantom lines) when the cylinder 436 is fully retracted.

FIGS. 10-14 show a sixth embodiment of a crane 510 of the present invention. Like crane 10, crane 510 includes a carbody 512, crawlers 514 and 516, a rotating bed 520, boom 522, boom hoist rigging 525, a load hoist line 524, a hook 526, a mast 528, a backhitch 530, a tension member 532 and a counterweight unit 534. The primary difference between the crane 510 compared to crane 10 is the configuration and placement of the backhitch, and the geometry of the arms 538. Arms 538 are not straight like arms 38 of crane 10, but rather have an angled portion 539 at the end that connects to the pivot frame 540. This allows the arms 538 to connect directly in line with the side members 541 of pivot frame 540, compared to connecting to the outside of the pivot frame 40 as in FIG. 4. The angled portion 539 prevents the arms 538 from interfering with the side members 541 of the pivot frame the when the counterweight is in the position shown in solid lines in FIG. 10.

In crane 510 the rotating bed is shortened, and hence the point on the rotating bed where the backhitch 530 is connected is forward of the point where the mast and backhitch connect, which causes the backhitch to be at an angle from the axis of rotation of the rotating bed. This angle may be between about 10° and about 20°. The preferred angle is about 16°. Further, while the backhitch 530 and tension member 532 are not connected at the very top of the mast 528, they are both still connected adjacent the top of the mast.

Figure 11:
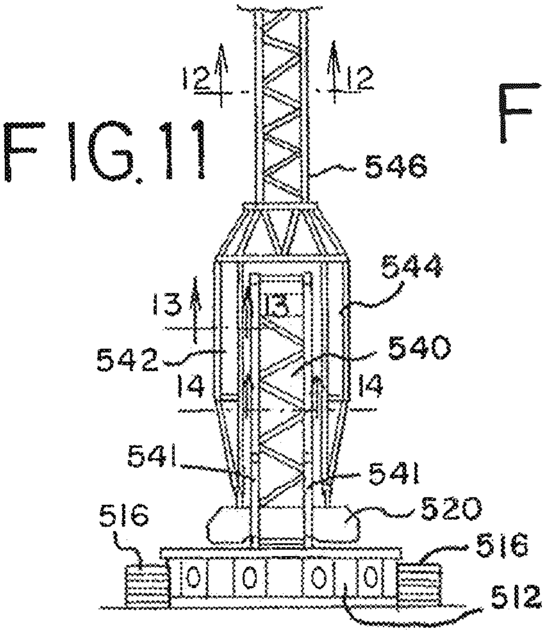
FIG. 11 is a partial rear elevational view of the crane of FIG. 10.
Figure 12:
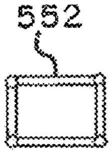
FIG. 12 is a cross-sectional view taken along line 12-12 of FIG. 11.
Figure 13:
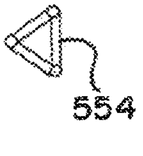
FIG. 13 is a cross-sectional view taken along line 13-13 of FIG. 11.
Figure 14:
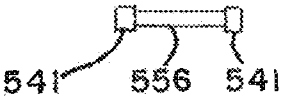
FIG. 14 is a cross-sectional view taken along line 14-14 of FIG. 11.
Figure 15:
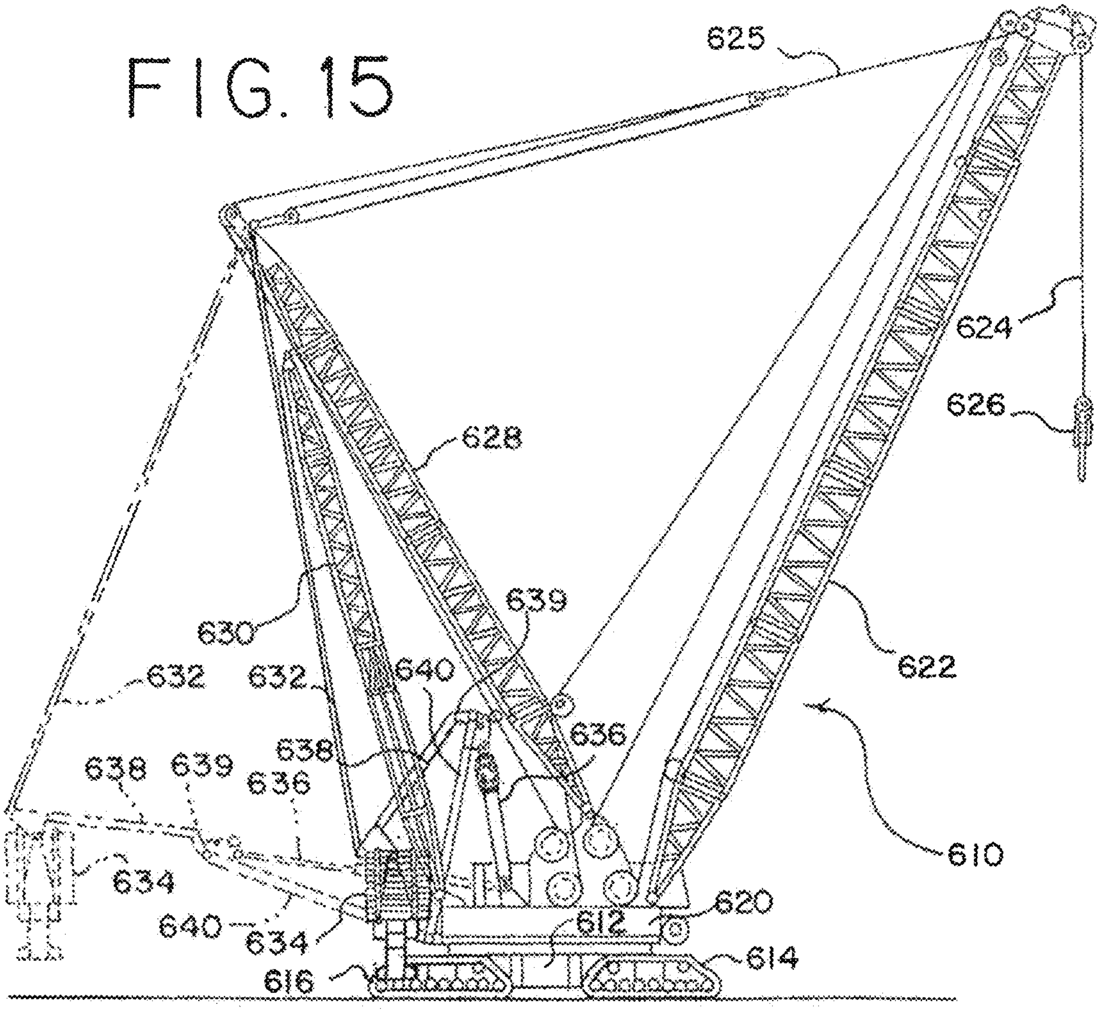
FIG. 15 is a side elevational view of a seventh embodiment of a mobile lift crane of the present invention, with dashed lines showing the counterweight in a second position.
Figure 18:
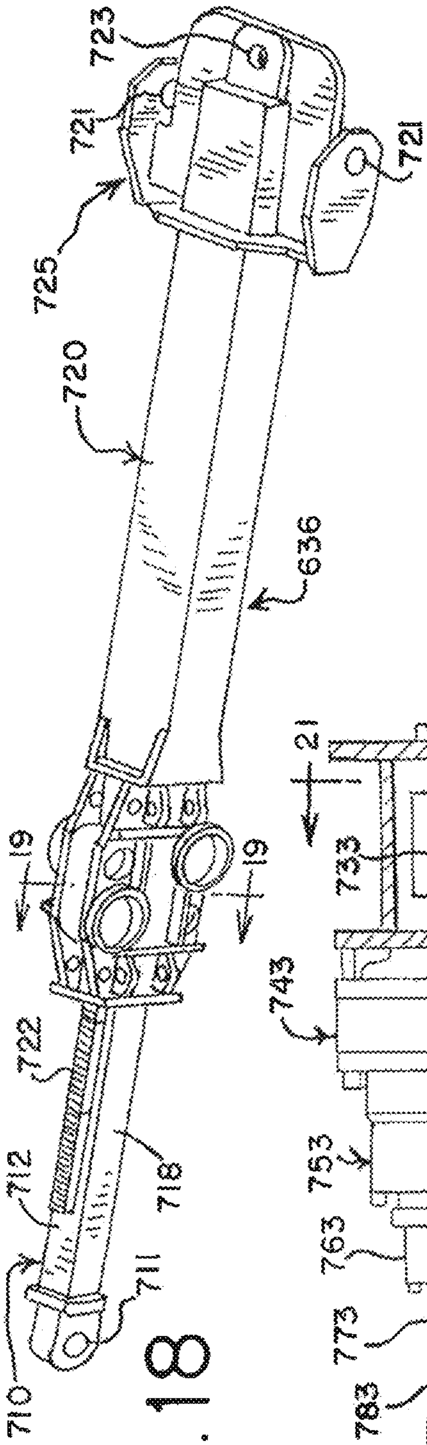
FIG. 18 is perspective view of the rack and pinion actuator used on the crane of FIG. 15 shown in an extended position, without the drive motor and gear for sake of clarity.

Also, as best seen in FIG. 11, the backhitch 530 has an A-frame configuration, with two spaced apart legs 542 and 544 and a central upstanding member 546. (In FIG. 11, the arms 538, cylinders 536 and counterweight unit 534 are not shown for sake of clarity.) The lattice connections 552 of the upstanding member 546 are shown in FIG. 12. The lattice connections 554 of the legs 542 and 544 are shown in FIG. 13. FIG. 14 shows the lattice connections 556 used to construct the pivot frame 540.

The legs 542 and 544 are spaced apart so that arms 538 and pivot frame 540 can fit between legs 542 and 544 of the backhitch 530 as the counterweight 534 swings outwardly. In the crane 10, the top lattice member of the pivot frame 40 is spaced down low enough so that when the pivot frame 40 is in the position seen in FIG. 3, the ends of the pivot frame can straddle the connection of the backhitch 30 to the rotating bed 20 without the lattice work of the pivot frame 40 contacting the backhitch. The counterweight unit 534 can be moved between a far forward position, when the hydraulic cylinder 536 is fully retracted, to a far rearward position (shown in phantom lines) when the cylinder 536 is fully extended. The A-frame structure permits the backhitch to be connected up closer to the centerline of rotation without interfering with the movement of the pivot frame 540 and arms 538. Having the backhitch connect at this closer position allows for the rotating bed to be shortened compared to crane 10.

FIGS. 15-26 show a seventh embodiment of a crane 610 of the present invention. Like crane 510, crane 610 includes a carbody 612, crawlers 614 and 616, a rotating bed 620, boom 622, boom hoist rigging 625, a load hoist line 624, a hook 626, a mast 628, a backhitch 630, a tension member 632 and a counterweight unit 634. The primary difference between the crane 610 compared to crane 510 is the use of a rack and pinion assembly 636 as the linear actuation device, instead of a hydraulic cylinder. Also, the pivot frame 640 is a solid welded plate structure, rather than individual pieces welded in a spaced apart lattice structure as shown in FIG. 11. Instead of two spaced arms, the counterweight movement structure of crane 610 has one arm 638 with a welded plate structure with an angled portion 639 at the end that connects to the pivot frame 640. This allows the arm 638 to connect directly in line with the pivot frame 640. FIG. 17 shows the pivot frame 640 and arm 638 linked together in a folded configuration in which they are transported between job sites. FIG. 17 also shows brackets and holes on the pivot frame 640 and arm 638 that are used to pin the pivot frame 640 and arm 638 to other parts of the crane. For example, holes 652 are used to pin the linear actuator 636 to the pivot frame 640. Holes 654 are used to pin the frame 640 to the rotating bed. Holes 656 are used to pin the bracket 659 on the end of arm 638 to the frame on the counterweight unit 634, and holes 658 are used to pin the tension member 632, in the form of two counterweight straps suspended from the mast top, to the bracket 659 on the end of the arm 638, and thus to the counterweight unit 634.

Figure 24:
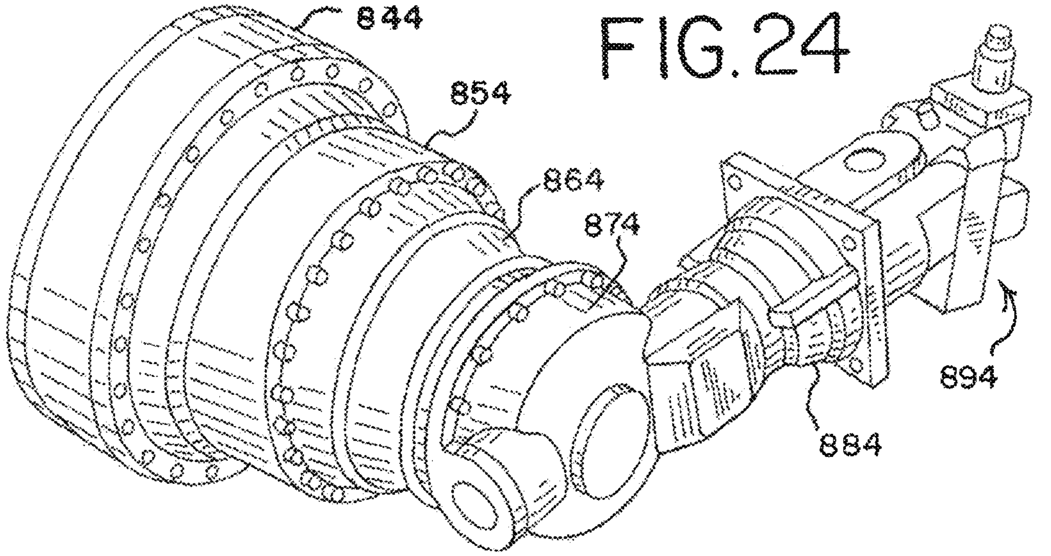
FIG. 24 is a perspective view of a second embodiment of a drive system for the rack and pinion actuator.
Figure 25:
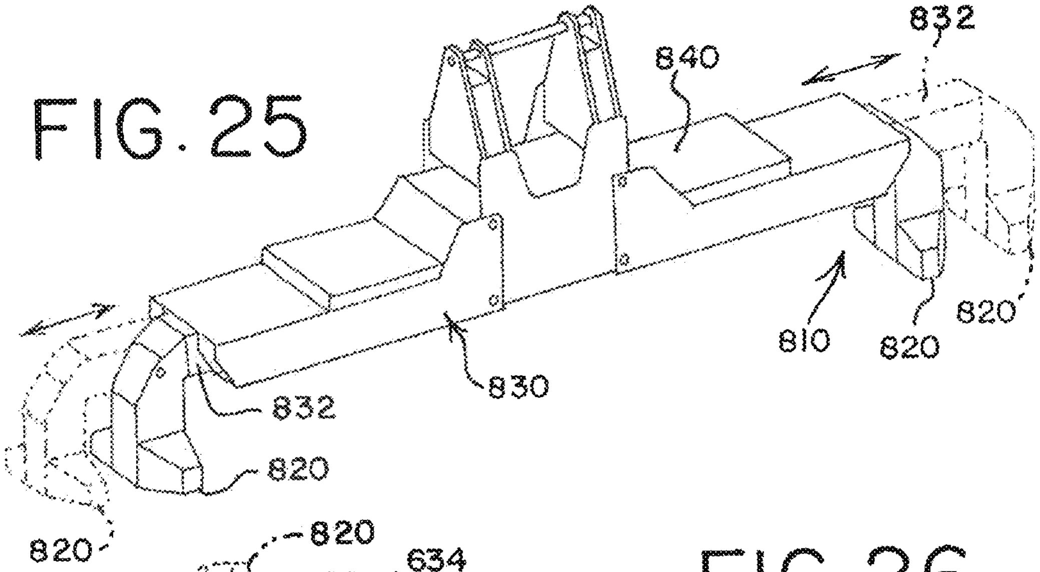
FIG. 25 is a perspective view of the counterweight tray and telescopic counterweight supports used on the crane of FIG. 15.

The structure of the rack and pinion assembly 636 is best seen in FIGS. 18-23, with an alternate arrangement for the drive system for the rack and pinion actuator shown in FIG. 24. The counterweight movement structure comprises a rack and pinion assembly having a rack 710 made from a welded plate structure, mounted inside of a housing 720. The housing 720 includes a carbody connection structure 725 at one end, which includes two holes 721 used to pin the rack and pinion assembly 636 to the rotating bed 620 to allow pivoting in a vertical plane, and another hole 723 that is used to pin the connection structure to the rotating bed to allow pivoting in another direction. The pins through these holes provide enough free play that no bending moments are imposed on the rack and pinion assembly when the crane goes through a swing operation. The rack 710 extends past the pinion gears and also terminates in a hole 711, which contains a universal joint (not shown) by which the rack is connected to the pivot frame 640.

Figure 19:
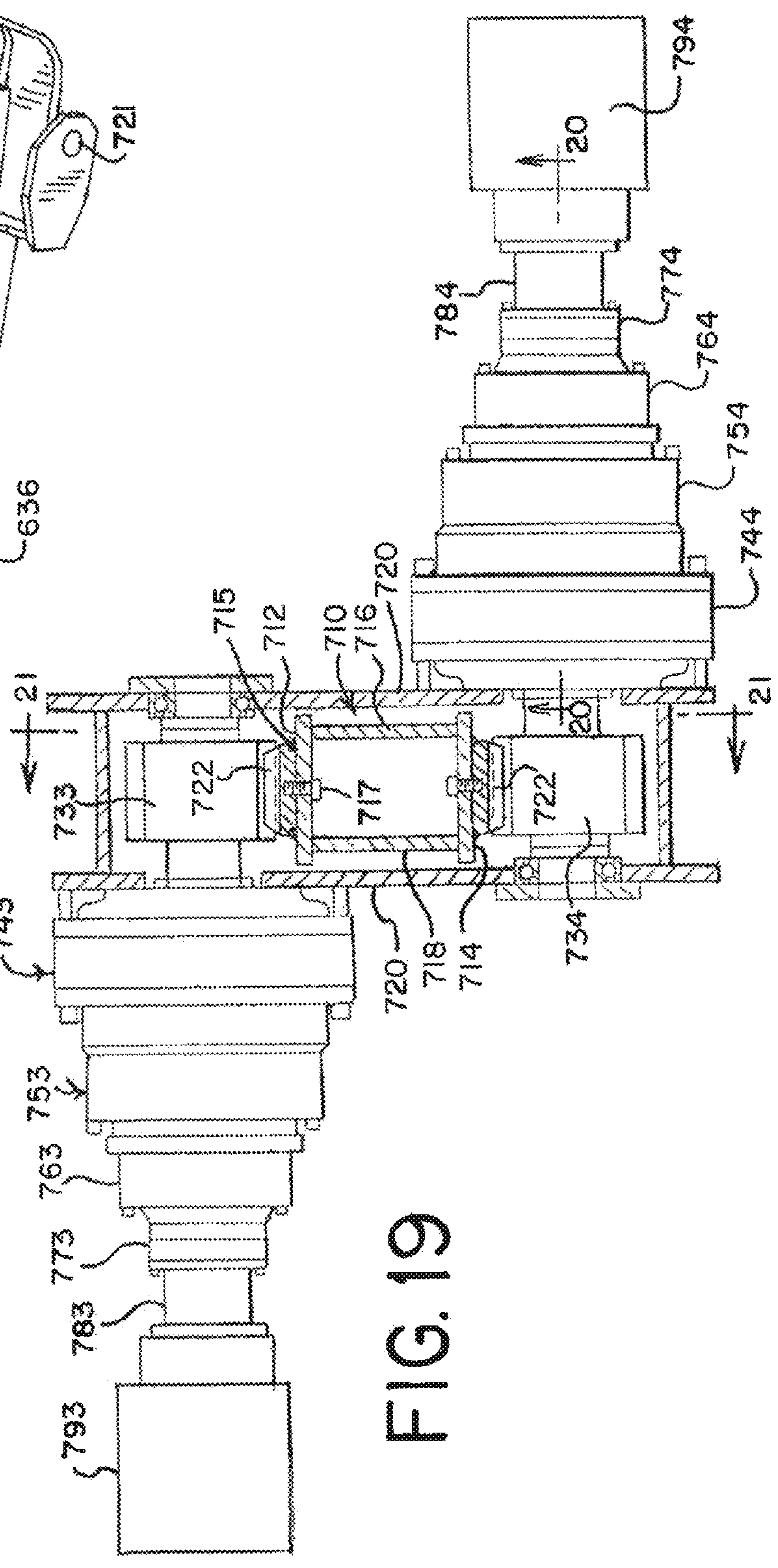
FIG. 19 is cross-sectional view of a first embodiment of a drive system coupled to the rack and pinion actuator, taken along line 19-19 of FIG. 18.

The rack 710 has a rectangular cross section with first and second sides 712, 714 opposite one another and third and fourth sides 716, 718 opposite one another. The rack includes teeth 722 on the first side and second sides 712 and 714. The teeth 722 are made with segmented teeth structures welded to the rack. 710. As best seen in FIG. 19, the teeth structures have a tapered upper shape, and include a recess in their outer bottom corners, which allows space for a weld bead 715. Each segment of the teeth 722 also includes four holes through which bolts 717 can be used to hold the teeth segments onto the sides 712 and 714 while they are being welded.

The rack and pinion assembly has first and third pinion gears 731 and 733 engaged with the teeth 722 on the first side 712 of the rack and second and fourth pinion gears 732 and 734 engaged with the teeth 722 on the second side 714 of the rack. Each pinion gear is driven by a separate hydraulic motor, two of which, 793 and 794, are shown in FIG. 19. The motor (not shown) driving the first pinion gear 731 is mounted on the housing 720 adjacent an opposite side of the rack 710 from the motor 793 driving the third pinion gear 733. The motor (not shown) driving the second pinion gear 732 is mounted on the housing 720 adjacent an opposite side of the rack from the motor 794 driving the fourth pinion gear 734. Each hydraulic motor is powered by a closed loop hydraulic system. In a preferred embodiment, the crane 610 will have two engines, each with a power output that drives eight pumps. One pump will power two hydraulic motors. However, valves in the hydraulic system, and controls in the control system, are preferably designed so that one pump could supply hydraulic power to all four motors used on the rack and pinion actuator.

The hydraulic motors (including motor 794) driving the first and fourth pinion gears 731 and 734 are mounted on the housing 720 adjacent the third side 716 of the rack 710, and the two hydraulic motors (including motor 793) driving the second and third pinion gears 732 and 733 are mounted on the housing 720 adjacent the fourth side 718 of the rack 710. Eight rollers 752 are secured to the housing 720 and have a rolling engagement with the marginal portion (outside of where the teeth are affixed) of the first and second sides 712 and 714 of the rack 710, providing stability to the structure.

Figure 20:
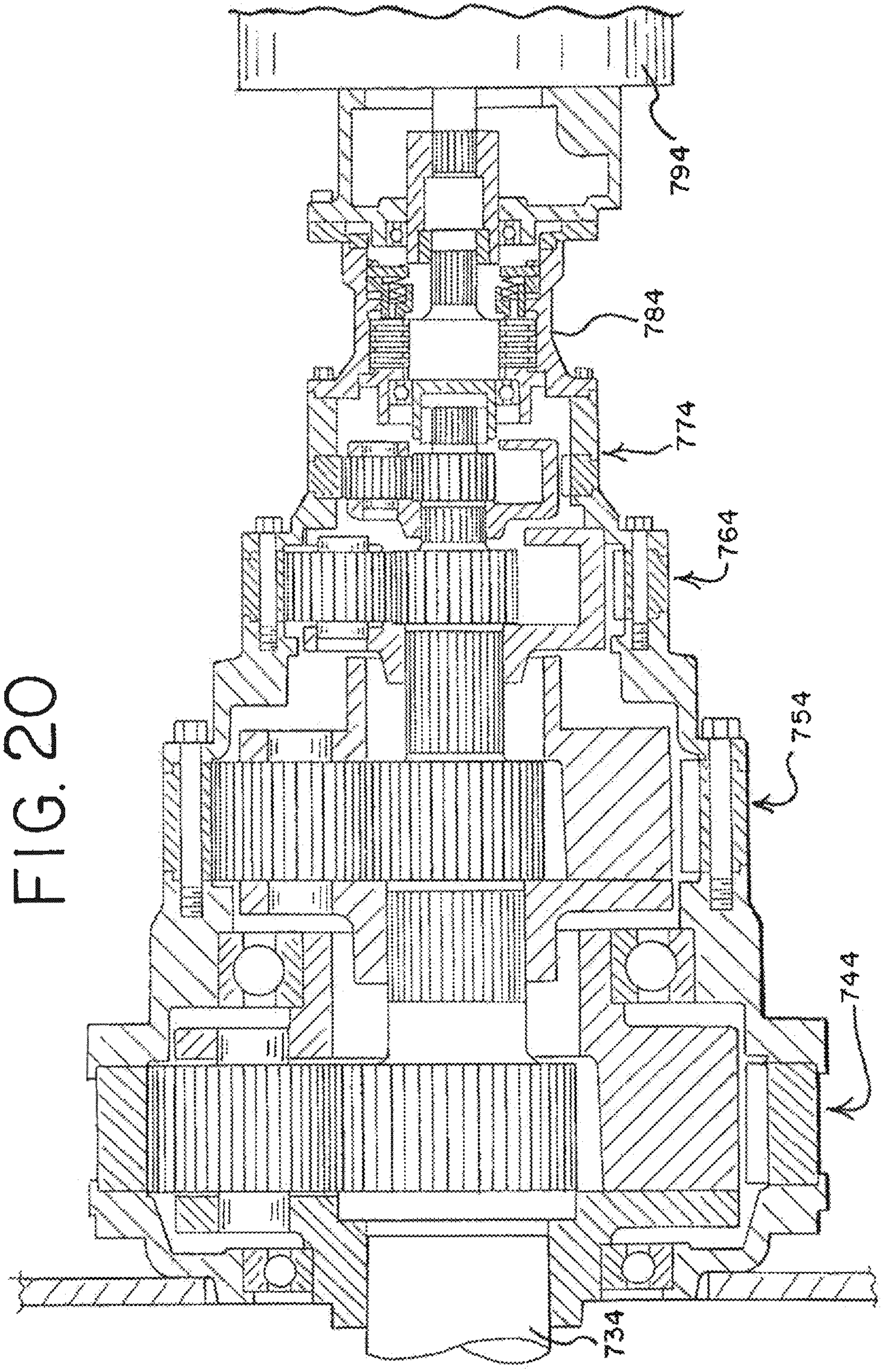
FIG. 20 is cross-sectional view taken along line 20-20 of FIG. 19.
Figures 21, 22, 23:
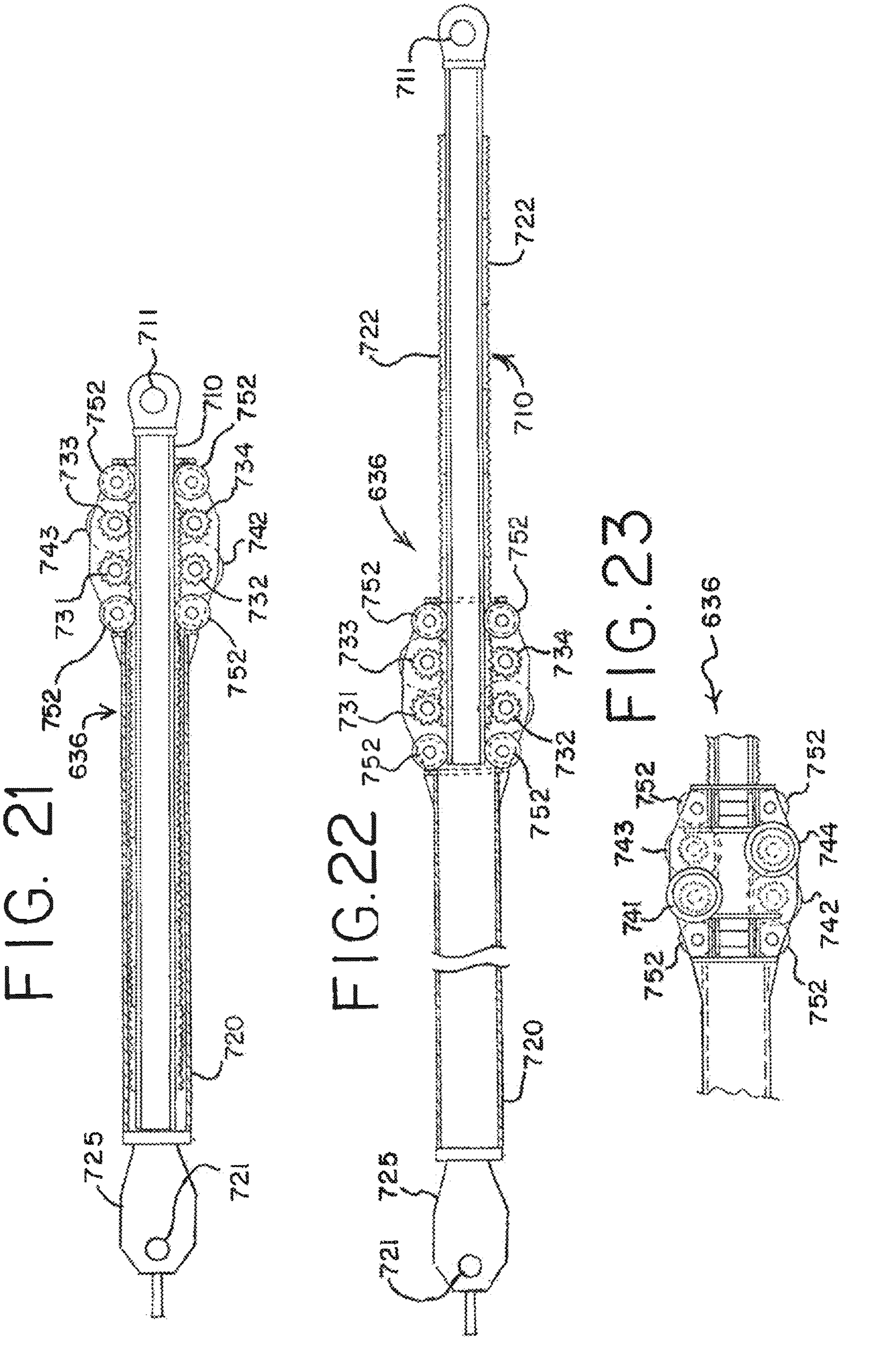
FIG. 21 is partial sectional view taken along line 21-21 of FIG. 19.
FIG. 22 is partial-sectional view like FIG. 21 but with the rack extended.
FIG. 23 is an elevation view of the motor drives on one side of the pinion assembly of FIGS. 21-22.

The rack and pinion assembly further comprises a series of planetary gear sets between each hydraulic motor and the pinion gear driven by that hydraulic motor. As best seen in FIGS. 19 and 20, in the embodiment depicted there are four sets of planetary gears 743, 753, 763 and 773 between the hydraulic motor 793 and the pinion gear 733. Also, right next to the hydraulic motor 793 there is spring set, hydraulic released, multi-disc brake 783. This same arrangement of motor, gears and brake is found with each motor. For instance, planetary gears 744, 754, 764 and 774, with brake 784, are mounted between motor 794 and pinion gear 734. The first planetary gear 742 driving pinion gear 732 can be seen in FIG. 21. The first planetary gear 741 driving pinion gear 731 can be seen in FIG. 23. FIG. 24 shows a different embodiment of the drive system for the rack and pinion actuator. In this embodiment the motor drive 894 and brake 884 portion have a right-angle input into the planetary gear system 874, 864, 854 and 844. The right-angle input arrangement provides for a shorter overall length to the drive system, which makes it easier to pack and ship this as a sub-assembly.

The crane 610 is equipped with a counterweight support system 810, which may be required to comply with crane regulations in some countries. Because the counterweight unit 634 in the present invention can move far forward with respect to the front of the rotating bed, the counterweight supports on the support system may interfere with swing operations unless they are sufficiently spaced apart. However, this makes the support structure itself very wide. The present inventors have thus developed a counterweight support structure attached to the counterweight unit that includes a telescoping counterweight support system.

The counterweight support system 810 includes at least two ground engaging members in the form of support feet 820 that can provide support to the counterweight in the event of a sudden release of the load. The support structure 810 comprising a telescoping structure 830 connected to and between the ground engaging members 820 such that the lateral distance between the ground engaging members 820 can be adjusted between at least a first and second position, as shown in solid and dotted lines in FIG. 25. The counterweight unit comprises a counterweight tray 840 on which individual counterweights 842 are supported, and the telescoping structure 830 includes two beams 832 and hydraulic cylinders (not shown) that fit within channels in the counterweight tray 840. The telescoping structure is similar to outriggers commonly used on tire-supported cranes. The counterweight unit 634 is constructed so that the counterweight support structure 810 can be removed and the crane can function both with and without it.

Figure 26:
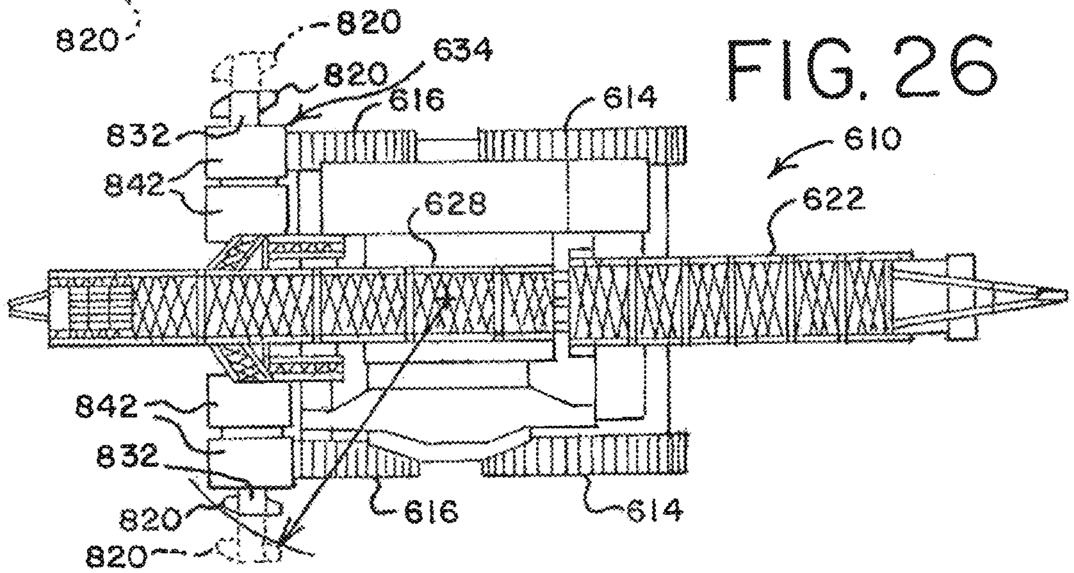
FIG. 26 is a top plan outline of the crane of FIG. 15.

As shown in FIG. 26, when the counterweight unit 634 is in its forward position, the counterweight support ground engaging members 820 will interfere with a swing operation of the crane in their first position, in which they are fully retracted. However, when the structure is extended to move the ground engaging members 820 to their second position where they are extended laterally, they will not interfere with a swing operation of the crane. If the counterweight unit 634 of the crane 610 is not fully forward, it may not be necessary to spread the supports 820 to their extended position. This is because at the partially back position, as shown in FIG. 16, the support feet 820 will not hit the crawlers 614 and 616 during a swing operation.

The support feet 820 are constructed so that when the counterweight unit 634 is positioned directly below the top of the mast 630, and thus the counterweight is at its closest point to the ground in the arc created by pivoting the tension member 632 about the top of the mast 630, the support feet 820 will still be an adequate distance off the ground (such as 15 inches) so that during normal crane operation, the support feet never contact the ground during pick, move and set operations. In that case, in the far forward position (shown in solid lines in FIG. 15), the support feet 820 may have 41 inches of clearance, and in the fully extended position of the counterweight (shown in dotted lines in FIG. 15), the support feet 820 may be 47 inches off the ground.

With the preferred embodiments of the invention, the counterweight unit is supported by the mast and the positioning mechanism at all times. There is no need for a separate wagon to support counterweight when less than the rated capacity is applied to the hook. Compared to the case of a free hanging counterweight as is used in some prior art mobile lift cranes, there is no need to set the counterweight unit on the ground. As a result, there is much less ground preparation needed for operation of the crane 10. This is a huge advantage over the systems presently in the field, in which the wagons are always in place and must be part of the lift planning with or without load on the hook. Frequently obstacles on the construction site make it difficult to position the crane and wagon. More recently designed telescopic systems used to position the wagon have been developed to lessen the size impact, but the wagon is still in place and must be taken into account. A critical part of having a wagon system is providing a rolling path during swing motion. With the wagons operating at very long radii (20 to 30 meters), timber matting is required for the very large sweep areas. Self supporting counterweight in the preferred embodiments of the present invention eliminates the wagon and the necessary matting.

The counterweight movement structure will generally be able to move the counterweight over a distance of at least 10 meters, and preferably at least 20 meters, depending on the crane size. In the embodiment of crane 10, the hydraulic cylinder 38 will preferably have a stroke of at least 5 meters. For the geometry shown, this results in the center of gravity of the counterweight unit being able to be moved to a distance of 28 meters (90 feet) from the center of rotation of the rotating bed. Alternatively, when the cylinder 38 is fully retracted, the center of gravity of the counterweight unit is only 7 meters (23 feet) from the center of rotation. This forward position can be even shorter, depending on the geometry of the positioning mechanism. Preferably the counterweight movement structure can move the counterweight to a position within 7 meters of the axis of rotation and to a position of at least 28 meters away from the axis of rotation. Thus for the crane 10 embodiment, the ratio of a) the total distance that the counterweight is capable of moving (at least 21 meters) to b) the distance between the center of gravity of the counterweight and the axis of rotation when the counterweight is at its nearest position to the axis of rotation (7 meters) is at least 3. For the embodiment of crane 410, the counterweight movement structure can move the counterweight over a distance of at least 22 meters with a cylinder stroke of only 5.6 meters. With this configuration, the counterweight can be moved to a position within about 6 meters of the axis of rotation and to a position of at least 28 meters away from the axis of rotation. Thus for the crane 410 embodiment, the ratio of a) the total distance that the counterweight is capable of moving (at least 22 meters) to b) the distance between the center of gravity of the counterweight and the axis of rotation when the counterweight is at its nearest position to the axis of rotation (about 6 meters) is at least about 3.67. Further, the preferred counterweight movement structures produce an amplified movement, moving the counterweight a greater distance than the stroke of the linear actuation device. In the embodiment of crane 410, the mechanical advantage is greater than 3:1, and is about 3.9:1. When the counterweight unit is suspended from the top of the mast, as it is in the embodiments shown in the figures, the counterweight movement structure can move and hold the counterweight at a position forward of the top of the mast such that the tension member is at an angle of over 5° compared to the axis of rotation, preferably over 10°, and more preferably over 13°. When the counterweight is at a position rearward of the top of the mast, the tension member is at an angle of at least 5°, preferably at least 10°, and more preferably over 15° compared the axis of rotation.

If desired, the extension of the cylinder 38 or rack and pinion assembly 636 can be controlled by a computer to move the counterweight unit automatically to a position needed to counterbalance a load being lifted, or a luffing operation. In such cases, a pin-style load cell may be used to sense the load in the backhitch, and move the counterweight to a point where that load is at a desired level. If desired, the counterweight unit position can be infinitely variable between any position within the range permitted by complete retraction and complete extension of the linear actuation device, cylinder 38 or rack and pinion assembly 636. The variable positioning system self compensates for the required load moment. In other words, if partial counterweight is installed, the counterweight will automatically be positioned farther back to offset the required load moment. Only when the maximum rearward position is reached will the crane's capacity be reduced.

In the preferred methods of the present invention, all of the counterweight is moved to the rearmost position, maximizing the counterweight's contribution to the crane's load moment. When no load is applied to the hook, the counterweight is positioned as far forward as possible. This forward position allows the counterweight to be maximized while maintaining the required backward stability. In preferred embodiments, the crane has a total amount of counterweight of at least 250 metric tonne, preferably at least 700 metric tonne, and more preferably at least 900 metric tonne, and a maximum rated load moment of at least 6,250 metric tonne-meters, preferably at least 17,500 metric tonne-meters, and more preferably at least 27,500 metric tonne-meters, and the ratio of maximum rated load moment to total weight of the counterweight is at least 25 tonne-meters/tonne, and preferably at least 30 tonne-meters/tonne.

As noted above, prior art designs generally had three counterweight assemblies. The variable position counterweight of the preferred crane has only one assembly. Where the conventional designs require 1,000 metric tonne of counterweight, the crane 10 with a single variable position counterweight will require approximately 70%, or 700 metric tonne of counterweight, to develop the same load moment. The 30% counterweight reduction directly reduces the cost of the counterweight, although this cost is partially offset by the cost of the positioning mechanism. As noted above, under U.S. highway constraints, 300 metric tonne of counterweight requires 15 trucks for transport. Thus, reducing the total counterweight reduces the number of trucks required to transport the crane between operational sites. The positioning mechanism is envisioned to be integrated into the rear rotating bed section and require no additional transport trucks. If it must be removed to achieve the transport weight, one truck may be required.

Because the counterweight is reduced significantly (in the above example, 300 metric tonne), the maximum ground bearing reactions are also reduced by the same amount. The counterweight is positioned only as far rearward as required to lift the load. The crane and counterweight remain as compact as possible and only expand when additional load moment is required. A further feature is the capability to operate with reduced counterweight in the mid position. The reduced counterweight would balance the backward stability requirements when no load is applied to the hook. The variable position function could then be turned off and the crane would operate as a traditional lift crane. The system is scalable. The advantages seen on a very large capacity crane will also be seen on a crane of 300 metric tonne capacity and perhaps as small as 200 metric tonne.

There are several advantages to using a rack and pinion assembly instead of a hydraulic cylinder as the linear actuation device for the counterweight movement structure. One of the most significant is that the cost of hydraulic cylinders large enough to generate the forces needed to move the large counterweight for which the invention is designed are greater than the costs for a rack and pinion assembly able to generate equal force and extension. Another is the fact that hydraulic fluid has a coefficient of thermal expansion that is greater than the coefficient of thermal expansion for steel. Thus, when a cylinder is used, and the hydraulic fluid heats up, it can change the extended length of the cylinder more than the length that a rack and pinion device will change under the same operating conditions. Also, with the preferred rack and pinion system, a mechanical locking feature can be easily included.

It should be understood that various changes and modifications to the presently preferred embodiments described herein will be apparent to those skilled in the art. For example, the backhitch could comprise a strap designed to carry just a tension load if the loading and operation of the crane never produces a compressive force in the backhitch. The linear actuation devices, rear arms and pivot frames can be interconnected differently than shown in the drawings and still be connected between the rotating bed and counterweight unit to produce the desired movement of the counterweight unit. Further, parts of the crane need not always be directly connected together as shown in the drawings. For example, the tension member could be connected to the mast by being connected to the backhitch near where the backhitch is connected to the mast. Such changes and modifications can be made without departing from the spirit and scope of the present invention and without diminishing its intended advantages. It is therefore intended that such changes and modifications be covered by the appended claims.

The invention claimed is:

1. A mobile lift crane comprising:
a carbody including moveable ground engaging members;
a rotating bed rotatably connected to the carbody such that the rotating bed can swing with respect to the ground engaging members;
a boom pivotally mounted on a front portion of the rotating bed;
a mast mounted on the rotating bed at a first end of the mast;
a backhitch coupled to the mast and the rotating bed;
a linear actuation device pivotally connected to the rotating bed;
a moveable counterweight unit coupled to the linear actuation device;
a tension member coupled to the mast and to one of the linear actuation device and the moveable counterweight unit; and,
wherein the linear actuation device is operable to move the moveable counterweight unit toward and away from a front portion of the rotating bed during a pick, move, and set operation by extending the linear actuation device.

2. The mobile lift crane of claim 1, wherein the linear actuation device is operable to move the moveable counterweight unit a greater horizontal distance from the rotating bed than a distance of a stroke of the linear actuation device that causes the moveable counterweight unit to move.

3. The mobile lift crane of claim 1, wherein the linear actuation device is indirectly connected to the moveable counterweight unit.

4. The mobile lift crane of claim 1, wherein the linear actuation device includes a first end coupled to the rotating bed, and wherein a first end of the tension member is coupled adjacent a second end of the mast and wherein a second end of the tension member is coupled to a second end of the linear actuation device.

5. The mobile lift crane of claim 1, wherein the linear actuation device includes a first end coupled to a rear portion of the rotating bed.

6. The mobile lift crane of claim 1, wherein the linear actuation device comprises at least one hydraulic cylinder.

7. The mobile lift crane of claim 1, wherein the linear actuation device is operable to move the moveable counterweight unit toward a mid-position by retracting the linear actuation device.

8. The mobile lift crane of claim 1, wherein the linear actuation device is operable to move the moveable counterweight unit over a horizontal distance that is at least three times a distance of a stroke of the linear actuation device that causes the moveable counterweight unit to move.

9. The mobile lift crane of claim 1, wherein the linear actuation device is operable to move the moveable counterweight unit over a horizontal distance that is at least 3.9 times the distance of a stroke of the linear actuation device that causes the moveable counterweight unit to move.

10. The mobile lift crane of claim 1, wherein the backhitch is coupled to a rear portion of the rotating bed.

11. The mobile lift crane of claim 1, wherein the tension member is coupled to the mast and to the linear actuation device.

12. The mobile lift crane of claim 1, wherein the linear actuation device is operable to move the moveable counterweight unit over a distance of at least ten meters.

13. The mobile lift crane of claim 1, wherein the carbody is not provided with any separate functional counterweight.

14. The mobile lift crane of claim 1, wherein the moveable ground engaging members comprise at least two crawlers.

15. A method of operating a mobile lift crane, the mobile lift crane including:
a carbody including moveable ground engaging members;
a rotating bed rotatably connected to the carbody such that the rotating bed can swing with respect to the moveable ground engaging members;
a boom pivotally mounted on a front portion of the rotating bed with a hoist line extending therefrom;
a mast mounted on the rotating bed at a first end of the mast;
a backhitch coupled to the mast and the rotating bed;
a linear actuation device pivotally connected to the rotating bed;
a moveable counterweight unit coupled to the linear actuation device;
a tension member coupled to the mast and to one of the linear actuation device and the moveable counterweight unit;
and wherein the method comprises:
positioning the moveable counterweight unit at a first position toward a front portion of the rotating bed when a load is not on the hoist line by extending the linear actuation device; and,
positioning the moveable counterweight unit at a second position away from the front portion of the rotating bed when the load is on the hoist line by extending the linear actuation device.

16. The method of claim 15, wherein the moveable counterweight unit is never supported by the ground other than indirectly by the moveable ground engaging members on the carbody throughout all pick, move, and set operations.

17. The method of claim 15, further comprising positioning the moveable counterweight unit at a mid-position by retracting the linear actuation device.

18. The method of claim 15, further comprising moving the moveable counterweight unit a greater horizontal distance from the rotating bed than a distance of a stroke of the linear actuation device that causes the moveable counterweight unit to move.

19. The method of claim 15, wherein the linear actuation device comprises at least one hydraulic cylinder.

20. The method of claim 15, wherein the linear actuation device is indirectly connected to the moveable counterweight unit.

* * * * *